(12) United States Patent
Bilger

(10) Patent No.: US 6,792,319 B1
(45) Date of Patent: Sep. 14, 2004

(54) HOME AUTOMATION SYSTEM AND METHOD

(75) Inventor: Brent Bilger, Los Altos Hills, CA (US)

(73) Assignee: Destiny Networks, Inc., Morgan Hill, CA (US)

( * ) Notice: Subject to any disclaimer, the term of this patent is extended or adjusted under 35 U.S.C. 154(b) by 513 days.

(21) Appl. No.: 09/693,299

(22) Filed: Oct. 19, 2000

(51) Int. Cl.[7] .............................................. G05B 11/01
(52) U.S. Cl. ............................ 700/13; 700/12; 700/19; 700/83; 700/275; 700/276
(58) Field of Search ......................... 700/83, 276, 275, 700/19, 12, 13

(56) References Cited

U.S. PATENT DOCUMENTS

| | | | |
|---|---|---|---|
| 4,407,447 A | 10/1983 | Sayegh | |
| 4,514,729 A | 4/1985 | Szarka | |
| 4,959,713 A | 9/1990 | Morotomi et al. | |
| 5,086,385 A | 2/1992 | Launey et al. | |
| 5,285,136 A | * 2/1994 | Duhame ..................... | 318/266 |
| 5,305,952 A | 4/1994 | Hannarong | |
| 5,319,698 A | * 6/1994 | Glidewell et al. ............ | 379/39 |
| 5,400,246 A | 3/1995 | Wilson et al. | |
| 5,406,173 A | 4/1995 | Mix et al. | |
| 5,473,202 A | 12/1995 | Mudge et al. | |
| 5,498,931 A | 3/1996 | Bedocs | |
| 5,499,196 A | 3/1996 | Pacheco | |
| 5,510,975 A | 4/1996 | Ziegler, Jr. | |
| 5,566,879 A | 10/1996 | Longtin | |
| 5,572,438 A | 11/1996 | Ehlers et al. | |
| 5,579,221 A | * 11/1996 | Mun ........................... | 700/83 |
| 5,621,662 A | * 4/1997 | Humphries et al. ......... | 700/276 |
| 5,640,143 A | 6/1997 | Myron et al. | |
| 5,668,446 A | 9/1997 | Baker | |
| 5,751,965 A | 5/1998 | Mayo et al. | |
| 5,814,902 A | 9/1998 | Creasy et al. | |
| 5,815,086 A | 9/1998 | Ivie et al. | |
| 5,832,283 A | 11/1998 | Chou et al. | |
| 5,901,246 A | 5/1999 | Hoffberg et al. | |
| 5,905,882 A | 5/1999 | Sakagami et al. | |

(List continued on next page.)

FOREIGN PATENT DOCUMENTS

| | | | | |
|---|---|---|---|---|
| JP | 06230144 A | * 8/1994 | ............ | G01V/9/04 |
| WO | WO 97/44720 | 11/1999 | | |

OTHER PUBLICATIONS

Yi–Min Wang et al. "Towards Dependable Home Networking: An Experience Report", Apr. 18, 2000, Technical Report, Microsoft Research Microsoft Corporation.*

(List continued on next page.)

Primary Examiner—Anthony Knight
Assistant Examiner—Thomas Pham
(74) Attorney, Agent, or Firm—Gray Cary Ware & Freidenrich LLP

(57) ABSTRACT

A home automation system and method for automatic control of controlled devices throughout a home. A unique architecture of occupancy sensors includes entry/exit sensors for detecting movement through doorways that separate rooms in the home, room motion sensors for detecting room occupancy, spot sensors to detect occupancy of specific locations within the rooms, and house status sensors to detect the status of certain parameters of the home. A central controller communicates with the sensors and controlled objects over a communications network, where the sensors and controlled objects can be added to the system in a 'plug and play' manner. The central controller controls the controlled objects in response to the entry/exit sensors, room motion sensors, spot sensors and the house status sensors. This control is accomplished by assigning each room to one of a plurality of room occupancy states, which dictate how the controlled objects are controlled by the central controller. The controlled objects also have controlled object states, which are used by the central controller to control the controlled objects.

64 Claims, 33 Drawing Sheets

U.S. PATENT DOCUMENTS

| | | | |
|---|---|---|---|
| 5,924,486 | A | 7/1999 | Ehlers et al. |
| 5,929,748 | A | 7/1999 | Odinak |
| 5,938,757 | A | 8/1999 | Bertsch |
| 5,946,209 | A | 8/1999 | Eckel et al. |
| 5,962,989 | A | 10/1999 | Baker |
| 5,971,597 | A | 10/1999 | Baldwin et al. |
| 5,973,594 | A | 10/1999 | Baldwin et al. |
| 6,003,131 | A | 12/1999 | Lee et al. |
| 6,021,324 | A | 2/2000 | Sizer, II et al. |
| 6,029,092 | A | 2/2000 | Stein |
| 6,091,320 | A | 7/2000 | Odinak |
| 6,192,282 | B1 | 2/2001 | Smith et al. |
| 6,199,136 | B1 | 3/2001 | Shteyn |
| 6,211,870 | B1 | 4/2001 | Foster |
| 6,263,260 | B1 | 7/2001 | Bodmer et al. |
| 6,288,716 | B1 | 9/2001 | Humpleman et al. |
| 6,378,000 | B1 | 4/2002 | Akatsu et al. |
| 6,385,495 | B1 | 5/2002 | Bennett |
| 6,405,103 | B1 | 6/2002 | Ryan et al. |
| 6,459,938 | B1 | 10/2002 | Ito et al. |
| 6,473,661 | B1 | 10/2002 | Wollner |
| 6,496,862 | B1 | 12/2002 | Akatsu et al. |
| 6,505,087 | B1 * | 1/2003 | Lucas et al. .................. 700/83 |
| 6,535,110 | B1 | 3/2003 | Arora et al. |
| 2001/0034754 | A1 | 10/2001 | Elwahab |

OTHER PUBLICATIONS

U.S. patent application Ser. No. 10/671,314, Bilger, filed Sep. 24, 2003.

U.S. patent application Ser. No. 09/693,530, Bilger, filed Oct. 19, 2000.

U.S. patent application Ser. No. 09/693,370, Bilger, filed Oct. 19, 2000.

U.S. patent application Ser. No. 09/693,468, Bilger, filed Oct. 19, 2000.

Paul Davidsson, et al., "Multi–Agent System For Controlling Intelligent Buildings", Proceedings of the Fourth International Conference on Multi–Agent Systems, Jul. 2000, pps. 377–378.

Paul Davidsson, "Intelligent Buildings: Energy Saving and Value Added Services", no date, pp. 107–221.

Magnus Boman et al., "Energy Saving and Added Customer Value In Intelligent Buildings", Proceedings of the Third International Conference on Practical Application of Intelligent Agents and Multi–Agent Technology, 1998, pps 505–517.

* cited by examiner-

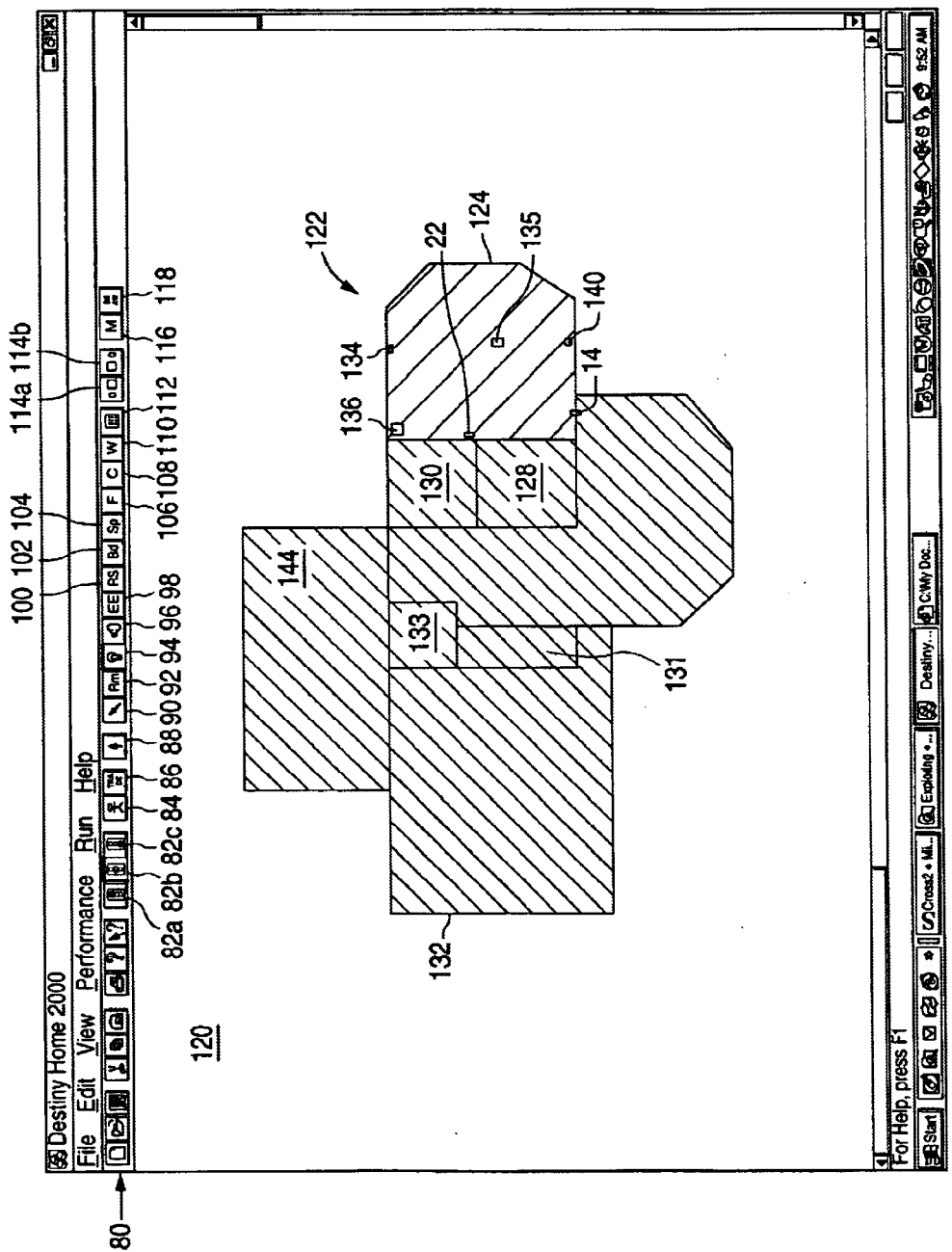

HOME AUTOMATION SYSTEM AND METHOD

MICROFICHE APPENDIX

Submitted with this application is a Microfiche Appendix containing a computer program listing for the Cross software program described below.

FIELD OF THE INVENTION

The present invention relates to home automation, and more particularly to a home automation system and method that enables automated control of electronic devices and appliances in a single family home. The home automation system uses a knowledge-based software application, a fast and reliable communications network, a number of different plug and play sensors and controlled objects, and a service model that enables the wide spread support and massive deployment of this system.

BACKGROUND OF THE INVENTION

For many years, "do-it-yourselfers" have been trying to automate their lights, stereos, HVAC, sprinkler systems, etc, using programs such as "HAI", "Home Director", "Activehome", "HouseLinc", "JDS TimeCommander", "JDS Stargate", "HAL2000", "HomeVoice", and "HomeVision" to generate commands and using X.10-based sensors, switches and controllers to execute the commands. This methodology has many problems.

The X.10 protocol itself, which uses signals transmitted from a controller over standard AC power lines within the house to receivers that control electronic devices, is slow and unreliable. Most X.10 commands take more than ⅓ of a second to send. This is too long for many applications, such as automated lighting, because humans—expecting an automated response—start to question whether the lights will come on at all after that amount of time. Moreover, most receivers do not acknowledge to the controller that the command was received. Therefore, if the command is not properly received, nothing gets controlled. Some recent X.10 modules now include "2-Way Transmitter Receivers" which acknowledge receiving commands, but the controllers for such modules are very expensive and the acknowledgement is very slow. Lastly, the X.10 protocol is very limited in its command set with only 16 defined commands. There is the possibility of having more commands, but there's not a standard for this protocol, and these additional commands take a long time to send. Other protocols using standard AC power lines tend to be too slow and expensive.

Traditional sensors used to recognize the presence of people in a room are slow and too prone to false positives. Traditional sensor architectures use one or more wide angle motion sensors that determine occupancy by detecting movement in the room. The problem with this approach is that either: (a) the sensitivity is set high enough to quickly detect people entering a room, in which case events such as the heat turning on or sudden sunlight changes may also indicate to the sensor that someone has entered the room (a condition known as a "false positive") or (b) the sensitivity of the sensor is turned down enough to prevent false positives, in which case the sensor takes too long to recognize people entering the room or it fails to recognize the presence of people in the room at all. Further, these sensors have problems accurately determining if people are present when those people are not moving much or at all (e.g. reading or watching television). The sensitivity needed to detect minor movements of a sedentary person in the room is vastly different from the sensitivity needed to detect a person walking briskly through the room.

The software used to operate controllers of home automation systems typically is not a knowledge-based program, but is rather a programming language that the home owner or installer uses to develop a customized program for each particular house. In this way, each sensor gets tested with "if/then" syntax and each controlled item becomes a control statement. This implies that each installation gets very little knowledge from previous installations and that there is very little reproducibility among homes. In addition, if anything goes wrong, only the person(s) responsible for programming the system can fix the problem. Therefore, each home owner either becomes the programmer for his/her home, or he/she becomes completely dependent on his/her installer.

The software typically used to control home automation is too limited in functionality. As mentioned above, each home is based on a program written or modified specifically for that home. Therefore, the programs tend to be limited in functionality. So, for example, the ability for different rooms to have different states and modes simultaneously for varying how devices are controlled when sensors are triggered, or the ability to easily change the operating characteristics of controlled devices, are not found in existing systems because it is so difficult to program such complicated features. There are a large number of additional examples that fall in this category.

The existing solutions also require special programming for each new piece of hardware. That is, "plug and play" hardware doesn't exist for much of the market. Again, since the control of the home is dependent on the program written by the home owner or installer, that person must write or modify the software to control each module. This is relatively easy in the case of X.10-based devices because of their limited command set (see above). However, for more complicated devices such as HVAC, whole house audio, surveillance cameras, etc., the knowledge level required to interface to the hardware exceeds the ability for many home owners.

One characteristic common with most home automation systems is that when things don't work well, they typically don't work at all. In many automated homes, the basic functionality of lights, HVAC, stereos, and many other devices require that the software program is up and running. If the power fails (for longer than a UPS can handle), or the controlling computer freezes or breaks down, or the software program has a bug, then it is difficult or impossible to control the controlled devices. For example, LiteTouch, Inc. makes a lighting control system where each circuit of lights is directly wired to a LiteTouch controller module. If that module breaks, or the computer that runs the LiteTouch program stops running, or there is a bug in the software, then there is no switch that can turn on these lights. What is worse is that keypads and remote controller modules replace the standard room light switches, so new users or visitors to a home that are not familiar with the home automation system will be unable to intuitively perform such basic functions as turning on a light.

Existing solutions further lack a good Internet interface. Because each house has a customized program running it, it is difficult to provide a generic interface that provides much value, nor is it easy to teach each home owner or installer how to write web-enabled programs. Existing home automation solutions also cannot be massively deployed or supported. While individual products such as X.10 light switches have broad market acceptance, the house-specific program and lack of plug and play software make it impossible to massively deploy any of today's solutions. Similarly, it is impossible to develop a leverageable support model for today's custom solutions.

There is a need for a home automation system that includes a reliable sensor architecture, a knowledge based central controller and operating software, compatible plug and play controlled objects, a fast and reliable communications network, and a service module and internet access that allows wide deployment of the system.

SUMMARY OF THE INVENTION

The present invention solves the aforementioned problems by providing a superior home automation system and method that better matches the needs and abilities of those wishing to automate their homes.

The home automation system of the present invention is for a home having a plurality of rooms separated by doorways, wherein each room has at least one of the doorways associated therewith. The home automation system includes a plurality of controlled objects for placement in rooms, a plurality of entry/exit sensors for placement at doorways to detect movement of a person therethrough, a plurality of room motion sensors for placement in the rooms to detect occupancy by a person therein, and a controller for controlling the controlled objects in response to both detected movement by the plurality of entry/exit sensors and detected occupancy by the plurality of room motion sensors.

In another aspect of the present invention, a method of automated control is used for a plurality of controlled objects placed in a plurality of rooms in a home that are separated by doorways, wherein a plurality of entry/exit sensors are placed at the doorways to detect movement of a person therethrough and a plurality of room motion sensors are placed in the rooms to detect occupancy by a person therein, and wherein each room has at least one of the doorways associated therewith. The method comprises the steps of controlling the controlled objects in response to detected movement by the plurality of entry/exit sensors, and controlling the controlled objects in response to detected occupancy by the plurality of room motion sensors.

Other objects and features of the present invention will become apparent by a review of the specification, claims and appended figures.

BRIEF DESCRIPTION OF THE DRAWINGS

FIG. 15A is a computer generated screen showing the activation of the light define key.

DETAILED DESCRIPTION OF THE PREFERRED EMBODIMENTS

Figure 1:
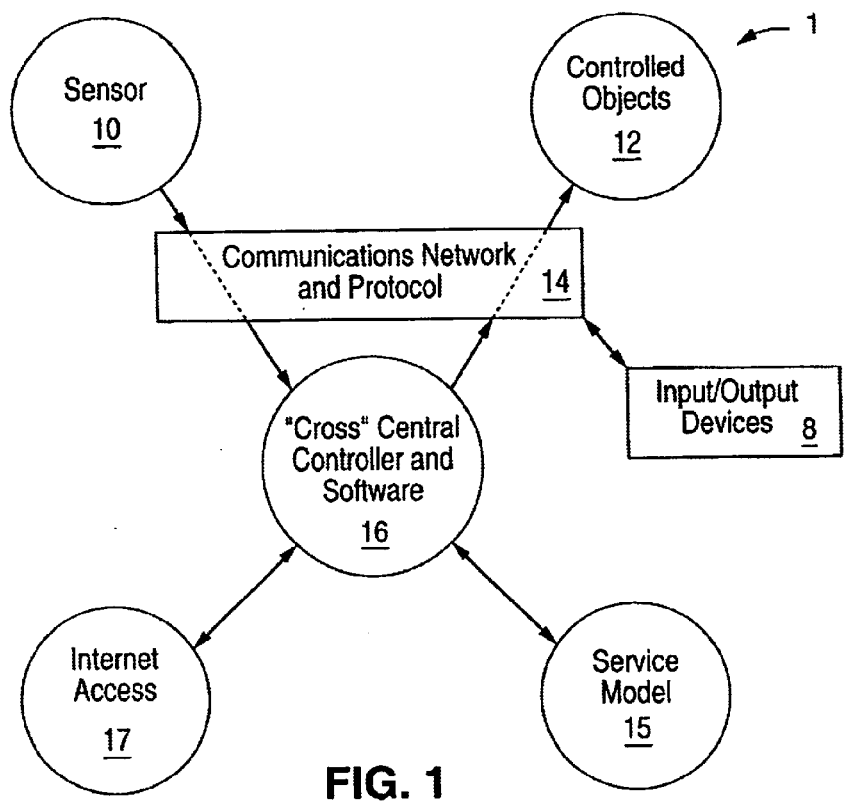
FIG. 1 is a diagram illustrating the major components of the home automation system of the present invention.

The present invention is a home automation system 1 as illustrated in FIG. 1, comprising six major components:

A. A unique architecture of occupancy sensors 10 that accurately and quickly determine whether a room is occupied or vacant.

B. A set of controlled objects 12 that "plug and play" with the knowledge-based central controller.

C. A fast and reliable communications network 14 that supports a large set of commands and input/output devices 8.

D. A knowledge-based central controller and operating software 16 ("Cross") that leverages past experience in automating and controlling the controlled objects 12 and anticipates the home owner's life style.

E. Internet access 17 that enables remote access and control.

F. A service model that enable wide spread support and massive deployment of this system.

A. Sensor Architecture

Figure 2:
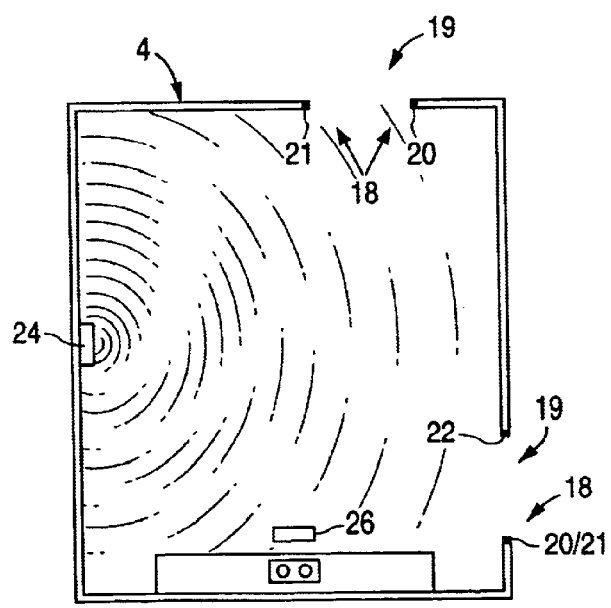
FIG. 2 is a top view of a room equipped with sensors and controlled objects of the present invention.

The present invention uses a unique sensor architecture to accurately determine whether a room is occupied or vacant. The architecture consists of four different types of occupancy sensors 10, used in combination, as shown by the room 4 illustrated in FIG. 2:

1) Entry/exit sensors 18 are located at (in or immediately adjacent to) doorway(s) 19 of a room 4. Doorways 19 define entrances/exits between two "rooms" (i.e. "rooms" as defined by the central controller 16 as further explained below) or to the outside of the house. The entry/exit sensors 18 provide two very important functions: quickly turning the room on, and quickly turning the room off. These sensors include a sending unit 20 that produces a very narrow visible or infrared light beam that is directed across the doorway 19 and received by a beam receiving unit 21. Such sensors are typically not effected by heating vents or sunshine. Any person passing through the doorway 19 will interrupt the light beam, thus providing a very quick and accurate signal whenever anyone enters or leaves the room. These narrow beam entry/exit sensors 18 greatly reduce the incidence of false positives in a room since they are located only adjacent to or in the doorway, and thus provide quick turn on and turn off times.

Figure 3A:
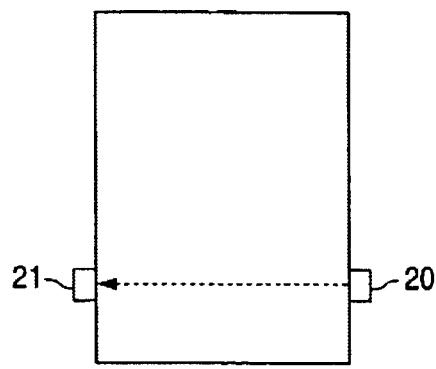
FIG. 3A is a side cross-sectional view of a doorway equipped with an exit/entry sensor.
Figure 3B:
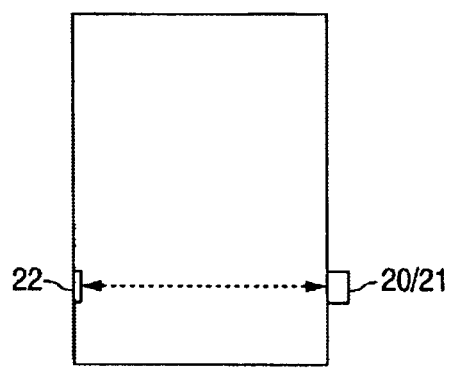
FIG. 3B is a side cross-sectional view of a doorway equipped with an alternate embodiment of the exit/entry sensor.
Figure 3C:
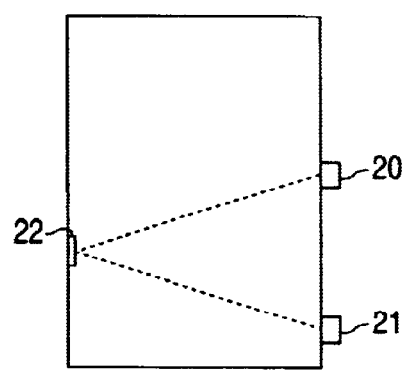
FIG. 3C is a side cross-sectional view of a doorway equipped with a second alternate embodiment of the exit/entry sensor.

Preferably the sending and receiving units 20/21 are located in the door frame itself, with the sending unit 20 located on one side of the doorway 19, and the receiving unit 21 located on the other side of the doorway 19, as illustrated in FIG. 3A. Alternately, the beam sending unit 20 and receiving unit 21 can be combined into a single device mounted on one side of the doorway 19, whereby a light beam reflector or reflective paint 22 is located on the opposite side of the doorway 19 to reflect the light beam back to the sending/receiving device 20/21, as illustrated in FIG. 3B. The height of the sensors 18 can be selected at a lower level to be less noticeable, or a raised height to avoid pets, or even disposed at varying heights to cover more area of the doorway (FIG. 3C).

Figure 3D:
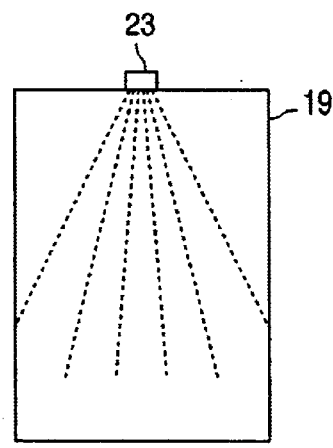
FIG. 3D is a side cross-sectional view of a doorway equipped with a third alternate embodiment of the exit/entry sensor.

An alternate embodiment of the entry/exit sensor 18 is illustrated in FIG. 3D, where a short range, narrow angle motion sensor 23 is mounted in or adjacent to the doorway 19. The range of sensor 23 is set to only detect movement immediately in or adjacent to doorway 19. Sensor 23 can utilize passive or active IR, and/or microwaves to detect movement adjacent to the doorway.

The entry/exit sensors 18 described above are commonly available, and will not be discussed in further detail. Other examples of entry/exit sensors include magnetic contact switches to detect movement of doors and windows, and spot sensors 28 (described below) placed adjacent to or in the doorway, both of which are currently commercially available.

2) One or more room motion sensors 24 are placed in a "room" to continually detect any movement within the room. Room motion sensors 24 are well known active or passive infrared, microwave and/or acoustic based sensors that detect the presence, movement, and/or heat of a person in the room. Unfortunately, these conventional room sensors, especially IR sensors, are susceptible to false positives. For example, IR based sensors are susceptible to being triggered by heat vents, sunlight and other changing sources of heat. Secondly, their sensitivity varies over time and with changes in ambient temperature. Finally, when the sensor sensitivity is lowered to reduce the instances of false positives, the sensor fails to detect the minor movements of person(s) in the room (e.g. someone reading or watching television).

While these problems are tolerable in some security related applications, they are not tolerable in a home automation system. Therefore, to each conventional room motion sensor is added a filter mechanism for filtering out false activations. The filter has three components: a "Debounce Time", a "Group Number" and a "Group Time", which dictate what detected movements will be considered as detected motion that will trigger the room motion sensor 24. In order for the room motion sensor 24 to be "triggered", the filter requires a certain number of motion detections (Group Number), separated by a certain time period (Debounce Time), all occurring within a certain time period (Group Time). For example, a typical setting would require the room motion sensor 24 to detect three separate movements (Group Number) separated by at least 2 seconds (Debounce Time) all within 15 seconds (Group Time) in order to be "triggered".

The filter mechanism can be embodied in hardware as part of the room motion sensor 24, or can exist as software in the main controller 16 (which is preferable because commercially available IR and microwave motion sensors could then be used). Most commercially available IR motion sensors also have a built in delay of 3 to 15 seconds before they will "fire" again. This time delay stops the filter from working properly with the system of the present invention. Therefore, such room motion sensors should be designed or altered to have less than 1 second of delay between "firings".

Another feature of the present invention is to automatically change the overall sensitivity of the room motion sensor(s) 24 by changing the filter mechanism settings and/or the sensor sensitivity settings (range and amplitude of required motion for detection), based upon the output of any of the four types of room sensors, the system's determination of whether the room is occupied or not, the time of day, the ambient light level, temperature, etc. For example, if the system determines that the den is occupied, the filter mechanism settings and/or sensor sensitivity settings are automatically changed to increase the room motion sensor sensitivity to detect smaller movements in the room (i.e. from someone reading or working at the desk to prevent the lights from shutting off). While the den is unoccupied, the room motion sensor(s) 24 are set to be less sensitive to prevent false positives. The changes in settings can vary depending upon the type of room, because certain rooms are characterized by more movement while occupied (e.g. kitchen, laundry room) than others (den, television room).

Another problem with commercially available room sensors is that they typically are used for home security, and, therefore, only need to fire once. Hence their accuracy can drift significantly over time and temperature without affecting the overall operation of the security alarm. However, for home automation, the room motion sensors 24 must maintain their sensitivity within a small range. Passive IR sensors detect occupancy and movement by detecting heat. As the ambient temperature rises, it becomes more difficult to detect heat variations caused by people present in the room. Therefore, to increase reliability, room motion sensors used with the present invention are preferably temperature compensated to minimize the effects of ambient temperature changes on the sensor itself. A thermistor is used to measure ambient air temperature, and the sensor sensitivity is increased as the ambient air temperature increases.

Figure 4A:
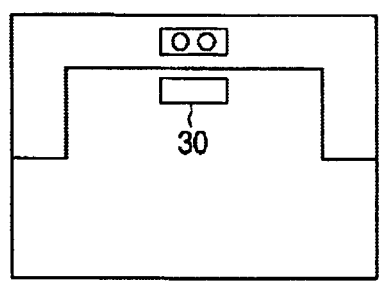
FIG. 4A is a top view of a kitchen equipped with a spot sensor.
Figure 4B:
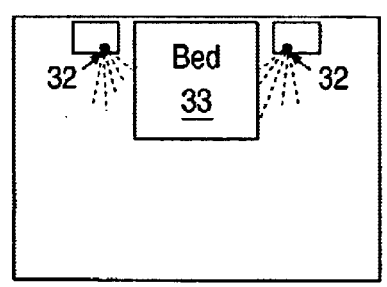
FIG. 4B is a top view of a bedroom equipped with an alternate embodiment of the spot sensor.
Figure 4C:
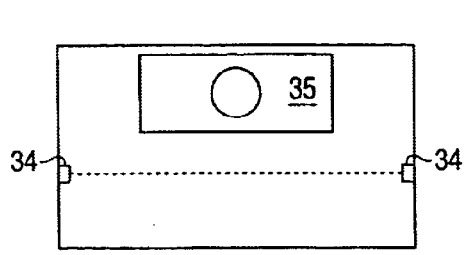
FIG. 4C is a top view of a bathroom equipped with a second alternate embodiment of the spot sensor.

3) Spot Sensors 26 are used to detect movement or occupancy at only particular points within the room. Spot sensors 26 include short range and narrow angle motion sensors, narrow light beam sensors, and pressure pad detectors, which are only activated by occupancy or movement at very specific points within the room. For example, a pressure pad 30 can be positioned in front of the kitchen sink for operating just the light over the sink, as illustrated in FIG. 4A. Short-range and narrow-angle motion sensors 32 can be installed under the nightstands or in the wall to detect motion along the sides of the bed 33 for operating low level path lighting for night time movement, as illustrated in FIG. 4B. A narrow light beam sensor 34 can be used to detect the presence of a person standing in front of the bathroom sink 35 for operating an overhead sink light (as illustrated in FIG. 4C).

Figure 5:
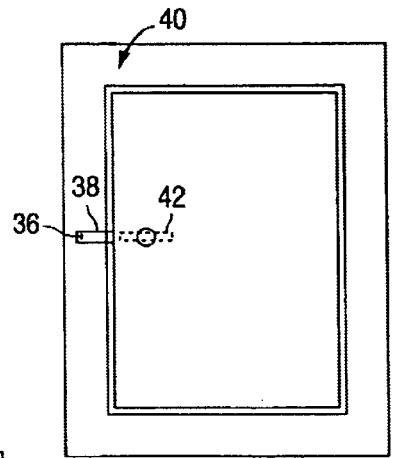
FIG. 5 is a side cross-sectional view of a door and door frame including a status sensor.

4) Status sensors 36 are used to monitor the status of certain parameters of the home. One such status sensor is a push button switch installed in the cylinder hole 38 of a door frame 40 into which the deadbolt cylinder 42 enters, as illustrated in FIG. 5. The push button switch senses whether or not the deadbolt cylinder 42 has been placed in its locked position inside cylinder hole 38, and communicates this status to the central controller 16. Similar status sensors can be used to monitor whether or not doors, windows, and gates both inside and outside of the home are open, partially opened for fresh air, closed, and/or properly locked.

A second example of a status sensor is a finger print recognition door bell. This door bell recognizes someone's fingerprint and communicates it to the central controller 16, which then decides whether that person should be let in (based on house mode, day of the week, etc). The central controller 16 also logs that person as being admitted or as having attempted to be admitted. The central controller 16 can set up an area of allowable rooms for that person to enter (e.g. only those room needed by a visiting neighbor to feed the dog during a vacation), but maintain the security alarm throughout the rest of the house). Finger print recognition devices are known in the art of computer security, and are not discussed in any further detail.

Further examples of status sensors 36 include a timer (for determining the current date and time), an ambient light sensor (for determining the ambient light level inside and/or outside the home), a moisture sensor (to detect ground moisture for triggering watering), a pool level detector (for measuring the level of the pool for automated refills), a carbon monoxide and argon gas sensor, a humidity sensor, a temperature sensor, a basement water level sensor, and a pipe temperature sensor.

The combination of entry/exit, room motion, spot and status sensors quickly, accurately and reliably determines which room(s) in the house are occupied, and the status of certain aspects of the home.

B. Plug and Play Controlled Objects

The controlled objects 12 include any electrical or mechanical devices found in the home (e.g. lights, televisions, VCR's, audio equipment, computers, appliances, door latches, windows latches, window shades, HVAC, gates, security systems, fireplaces, ceiling fans, skylights, cameras, irrigation, telephone ringers, etc.). Controlled objects 12 further include remote switches, plugs, controllers, and motors that operate the above listed devices found in the home. Controlled objects 12 are plug and play compatible with the communication network 14, and are automatically recognized by the central controller 16 once connected to network 14). Thus, it is easy to set up, add, delete and move controlled objects 16.

As explained below, each room has various "on" modes, during which one or more controlled objects in the room may be turned on. Each controlled object is controllable separately, so that any combination of controlled objects can be turned on at any given time and mode.

Figure 6A:
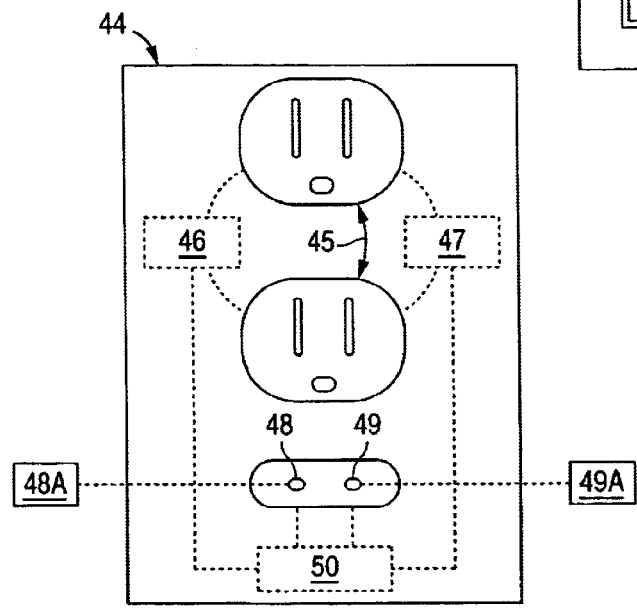
FIG. 6A is a front view of the smart plug of the present invention.
Figure 6B:
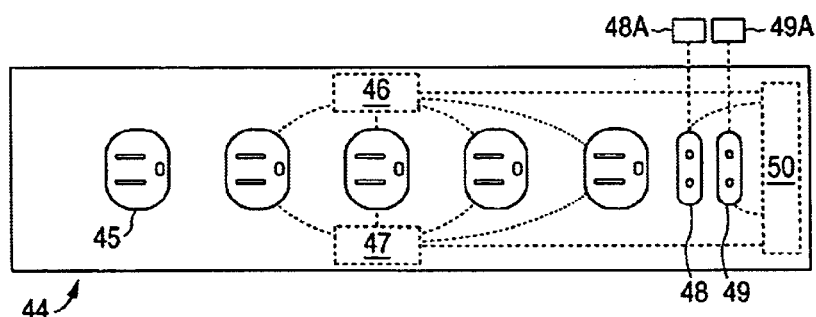
FIG. 6B is a top view of an alternate embodiment of the smart plug of the present invention.

Controlled objects 12 can be combined with sensors 10 to provide feedback and/or commands to the central controller 16. For example, an entertainment outlet 44, as illustrated in FIG. 6, includes standard dual plug outlets 45 for 110V, but further includes a power switch 46 (operable by the central controller 16 to turn on, turn off, and dim the electrical power to outlets 45), a current sensor 47 (to measure the current flowing through outlets 45 to detect whether the equipment plugged in to them is powered on or off), an IR transmitter jack 48 (for transmitting electrical signals to a remote IR transmitter 48A), an IR receiver jack 49 (for receiving electrical signals from a remote IR receiver 49A), and a communications port 50 connected to all elements of the entertainment outlet 44 for sending/receiving commands to/from central controller 16). IR transmitter jack 48 and IR receiver jack 49 are standard dual electrical connectors for removably connecting wires to entertainment outlet 44. At the other ends of those wires are remote IR transmitters 48A (which transmits IR signals based upon the electrical signals originating from central controller 16) and IR receivers 49A (for receiving IR signals and converting them to electrical signals for central controller 16). IR transmitter 48A is known in the art (e.g. using light emitting diodes), and preferably attaches to the IR input window of any IR controlled device (e.g. televisions, VCRs, etc) using adhesive or tape, but in a manner not to block other IR signals (e.g. from a remote control) from the IR input window. More than one IR transmitter 48A can be connected to the wire attached to IR transmitter jack 48.

IR receiver 49A receives infrared signals from a remote control device designed to operate the central controller 16, as well as monitors the local control of any IR controlled devices in order to detect occupancy (e.g. someone using a remote control device to operate a TV). Thus, IR receiver 49A is preferably disposed near such IR controlled devices. More than one IR receiver 49A can be connected to the wire attached to IR receiver jack 49. Communications port 50 is connected to communications network 14 for relaying communications between central controller 16 and the elements of the entertainment outlet 44 (power switch 46, current sensor 47, IR transmitter jack 48, IR receiver jack 49). Entertainment outlet preferably mounts in the wall, but can also be placed in the room in form of a strip plug (see FIG. 6B).

C. Communications Network

The communications network 14 provides reliable communications between the central controller 16, the sensors 10 and the controlled objects 12. There are several network configurations and protocols that are ideal for the present invention.

Figure 7A:
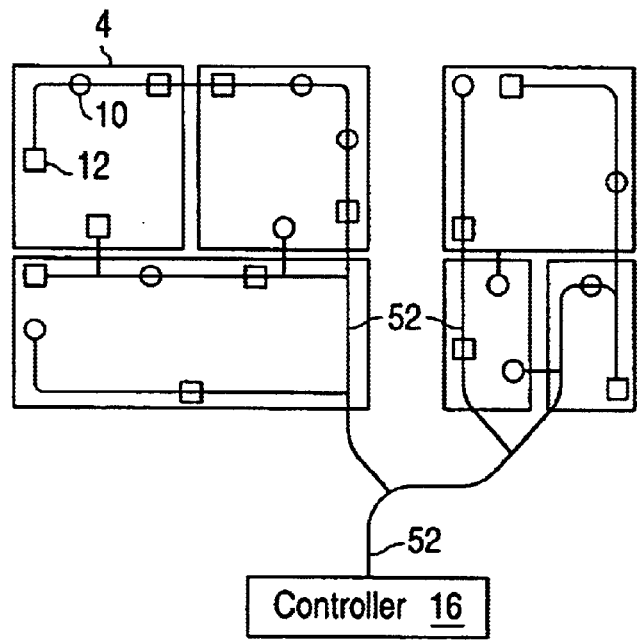
FIG. 7A is a plan view of rooms in a house equipped with a control/sensor network.

FIG. 7A illustrates the preferred configuration for network 14, which includes a control/sensor network 52 wired to each "room" 4 in the house. Control/sensor network 52 is a single set of wires bused throughout the house, preferably while the house is under initial construction. Once the AC power lines are installed but before the walls are completed, the network wiring can be easily installed in just one day, often times using the same holes, conduit and/or junction boxes as the AC lines. The control/sensor network 52 is connected to all the sensors 10 and controlled objects 12, as well as to the central controller 16. Each sensor 10 and controlled object 12 includes a decoder that utilizes a unique address on the control/sensor network 52. The signals from sensors 10 include these addresses so the central controller 16 can identify the signals' origins. Likewise, each command from the central controller 16 contains the address(es) for certain controlled object(s) 12, and each controlled object 12 is responsive only to commands containing its address, and/or a multicast or broadcast address for a group of controlled objects.

Figure 7B:
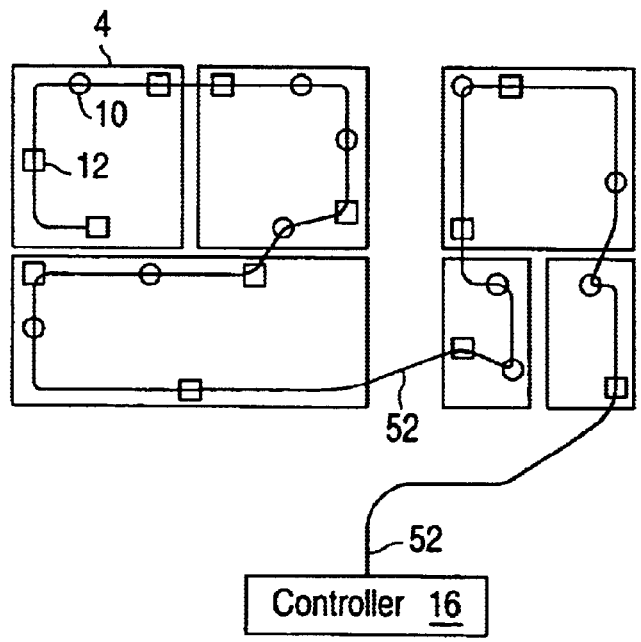
FIG. 7B is a plan view of rooms in the house equipped with an alternate embodiment of the control/sensor network.
Figure 7C:
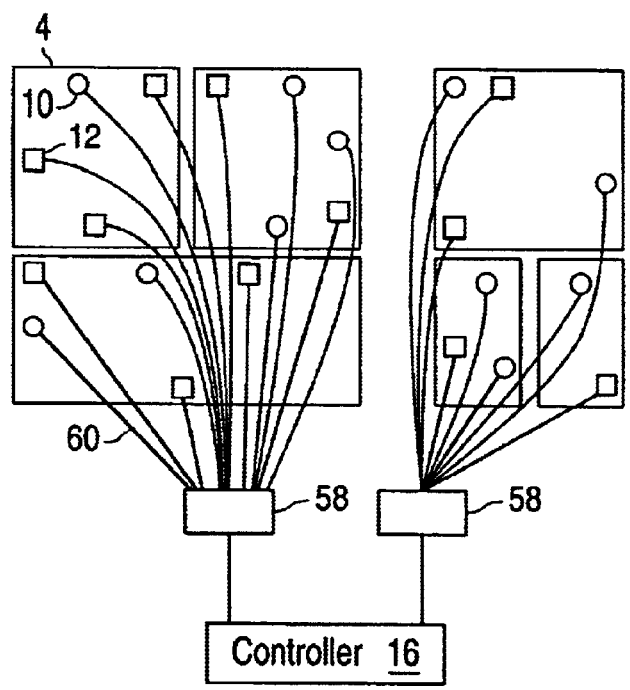
FIG. 7C is a plan view of rooms in the house equipped with a second alternate embodiment of the control/sensor network.
Figure 7D:
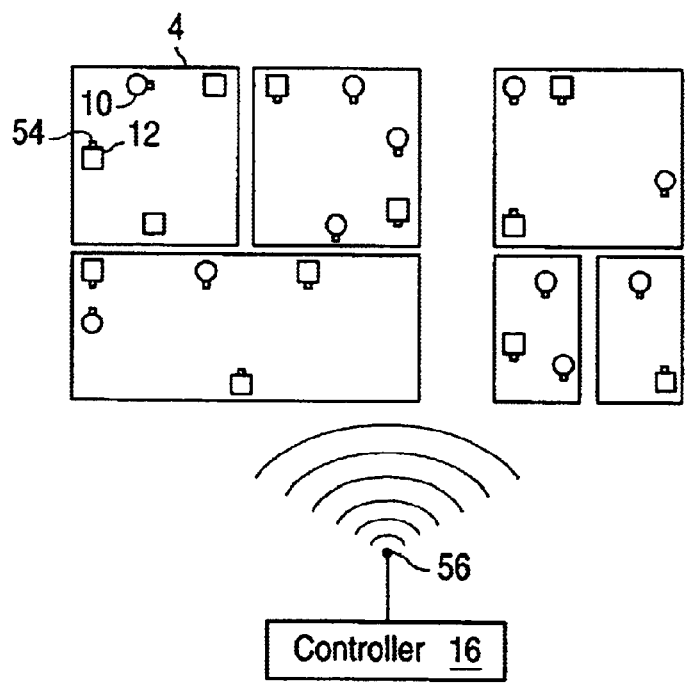
FIG. 7D is a plan view of rooms in the house equipped with a third alternate embodiment of the control/sensor network.
Figure 7E:
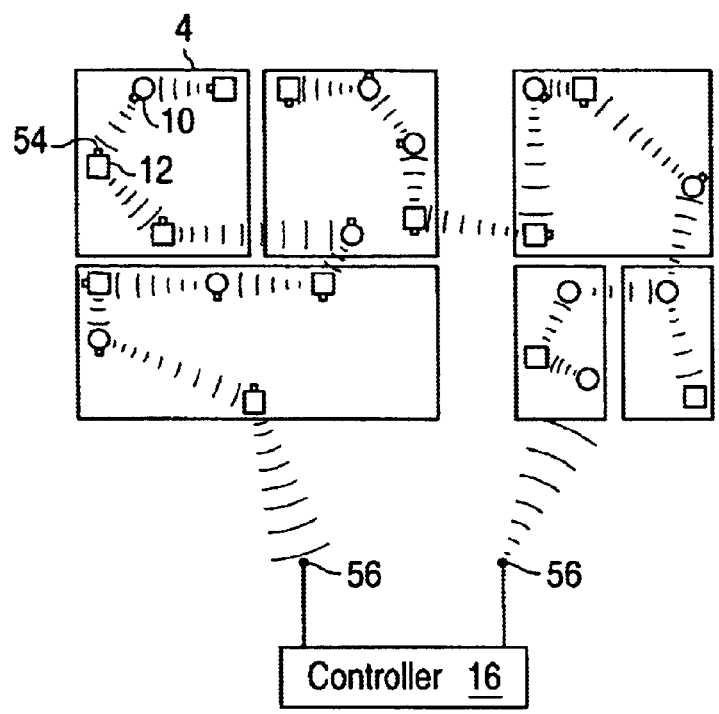
FIG. 7E is a plan view of rooms in the house equipped with a fourth alternateembodiment of the control/sensor network.

FIG. 7A illustrates a random configuration for control/sensor network 52. FIGS. 7B–7D illustrate alternate configurations for routing control/sensor network 52 through the house. A single set of wires can be woven throughout the house in a straight bus or daisy chain configuration, as illustrated in FIG. 7B. The central controller could have one or more central hubs 58 that have individual communications lines 60 each connected to a single sensor 10 or controlled object 12, as illustrated in FIG. 7C. The advantage of this embodiment is that the sensors 10 and controlled objects 12 can use standard Ethernet twisted pair connectors and hubs, but the drawback is that the system is less versatile, and more costly to wire. Alternately, the control/sensor network 52 could be wireless, where each sensor 10 and controlled object 12 including a transceiver 54 that communicates with one or more central transceivers 56 of the central controller 16 (as illustrated in FIG. 7D), or with other transceivers 54 in a token bus configuration (as illustrated in FIG. 7E). Lastly, control/sensor network 52 could be a powerline based system (e.g. X-10 system), where the sensors 10, controlled objects 12 and central controller 16 communicate with each other over the existing AC power lines in the house. The advantage of this embodiment is that it is easy to retrofit existing homes, but the drawbacks are that it is less versatile (only works for devices connected to 110V), can be more costly, and can have a slower communications rate (although some of the slowness can be overcome by using the combination of sensors 10 as described above). It should be noted that the above described network embodiments can be combined to form the control/sensor network 52. For example, a straight or daisy chain bus can be used for communicating with the sensors, while a powerline based system can be used for communicating with the controlled objects.

For hardwired and wireless control/sensor network configurations, any standard protocol and/or physical layer can be used: SNMP, UDP, IP, HTTP, FTP, TCP, IP, JAVA, CORBA, Ethernet, PCI bus, etc. For powerline control/sensor network configurations, the X-10, LonWorks or CEBus protocols can be used. Powerline control/sensor networks should use sophisticated encryption devices to prevent interference with, and intentional misuse by, neighbors and hackers using similar powerline control/sensor networks and controllers.

Figure 7F:
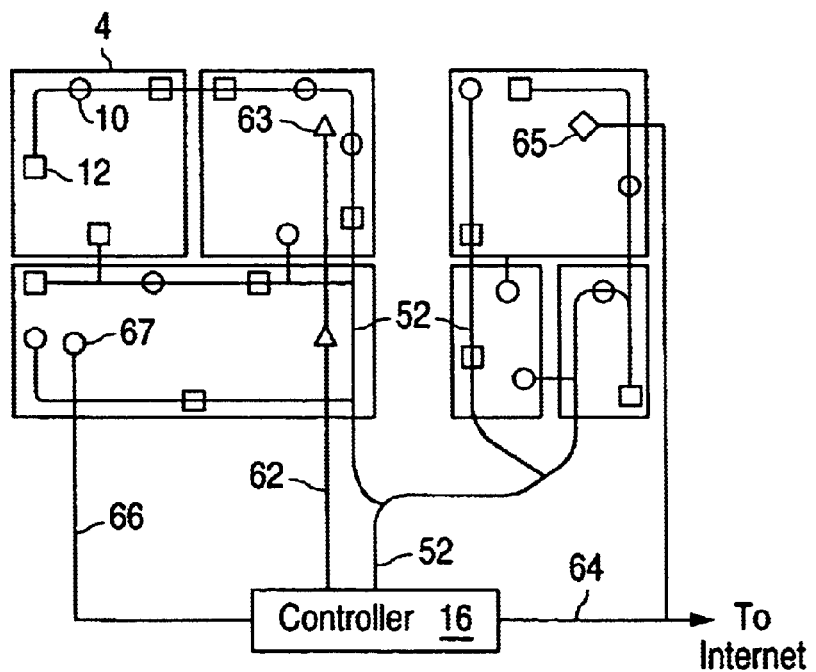
FIG. 7F is a plan view of rooms in the house equipped with a control/sensor network, a medium speed network, a PC network and a video network.

The communications network 14 preferably includes additional networks piggybacked with the control/sensor network 52, as illustrated in FIG. 7F. For example, a medium speed network 62 connects the central controller 16 to voice based devices 63 such as digital stereo, microphones, intercom devices and cameras. A PC network 64 connects the central controller 16 to internet based devices 65, such as servers, internet dedicated devices and appliances, and an internet service provider. Lastly, a video network 66 connects to video devices 67 such as cameras, television, HDTV, cable, and satellite. Video network 66 can be a simple coax cable connecting incoming signals to television (s), or a more elaborate internal hardwired or wireless video network. Each of these networks can be hardwired, or set up as a wireless network, in the same configurations as described and shown above (in FIGS. 7A–7E) for the control/sensor network 52.

The preferred embodiment of medium speed network 62 includes Epigram/Broadcom Home PNA chips for Audio/Voice/Video controllers for whole house audio, voice recognition and synthesis, and video cameras. The Home PNA standard allows a single pair of wires to be bused around the home while still providing the required quality of service to maintain the required bandwidth for each application. This allows a video picture from an area/room to be digitized and sent over the Home PNA network. The picture can be captured on a hard disk or sent out over the internet for remote viewing (e.g. "Nanny watch").

The above described communications networks can be separated out or combined together using the same wiring based upon speed, capacity, compatibility and cost considerations.

D. Knowledge Based Control System and Operating Software

The home automation system of the present invention utilizes a central controller 16 that employs a novel software program called "Cross" (Computer Replicated Object Sourcing and Synchronization).

The most important difference between Cross and all existing programs for controlling home automation is that Cross is a knowledge-based application whereas the others are just graphical user interfaces for programming languages. The key analogy here is the following. In the early days of computing, a small number of techno-savvy people used Lotus 123 and Microsoft Excel to help them with their home finances. They would type in equations for each cell of the spread sheet to allow them to create tabulated check book records and maintain stock buying and selling information. However, each person had his/her own way of doing it such that none could learn much from the others, and each person was responsible for making his/her spread sheet work. Then, along came Quicken and other knowledge-based products. This was market changing because these programs 1) did most of the things people wanted to do automatically, 2) accumulated knowledge over time (in the form of yearly updates), and 3) most importantly they enabled the mass market of non-technical people to get the benefits of computer-based personal finance without the need to program it themselves and/or maintain it themselves. Today, home automation is in the "Excel" stage. Techno-savvy home owners and integrators are programming and maintaining each house separately. Cross is the equivalent of Quicken. It is a knowledge-based application that will enable convenient home automation for the mass market.

In the preferred embodiment, the central controller 16 is a personal computer or dedicated control device running the Cross program, and using any standard communications protocol to communicate over the network 14. Programming and communications with Cross is accomplished locally (PC keyboard and mouse) or remotely (over the internet or by modem). Users can also communicate and control Cross from the controlled rooms through smart switches, IR receivers, keypads, voice recognition transceivers, etc. (described in more detail in the "Local Control" section below).

There are eleven major concepts at the heart of Cross.

1. House Modes

Cross has six "house modes", (or "home modes") which indicate where the family members are and what they are doing. The house is always in one of these 6 house modes:

1) Home—The family is home and is actively doing things in the house.
2) Night—The family is in for the night. Any doors or windows opening may be cause for an alarm.
3) Away—No one is home. Motion in some room may be cause for an alarm.
4) House tour—Someone is giving a tour of the house. Special modes are enabled such as the verbal tour of each room.
5) Party—A party is going on. Special modes may be enabled.
6) Special—A user-defined mode that enables special things to turn on and off as defined by the home owner.

These house modes are either manually set by pushing a switch (by people entering or exiting the home or retiring for the evening), or are automatically set by timers, ambient light sensors, spot sensors, etc.

2. House Systems

The second concept of Cross is that there are a number of "Systems" that exist throughout the house. Many of these systems are themselves technically controlled objects 12, where they further control or modify objects in the rooms as room states or room modes are changed (described below). Examples of such systems include: a whole house audio system (for controlling speakers in the rooms), an IR transceiver (for controlling TVs, VCRs, stereo components, etc), a HVAC system (for controlling heating or cooling vents in the rooms), as well as the control/sensor network 52, medium speed network 62, PC network 64, and Video network 66 described above.

3. Room States, Room Modes and Room Operational Modes

The third concept is that each room and/or area of the house has a unique identity referred to as its "Room". This would include the obvious rooms such as the kitchen, living room, bedrooms, etc, but also includes hallways, stairways, and subsections of larger rooms or the outdoor yard (such as the driveway or the "north" yard). Rooms have "Room States" (to determine occupancy), "Room Modes" (to determine which controlled objects 12 should be activated given a particular "room state"), and "Room Operational Modes" (for overriding the normal operation of the rooms). These Room States, Modes and Operational Modes are all determined by the signals received from the sensors 10 in combination with status sensors and other conditions in the house.

Each room is in one of 6 "Room States", which basically determines whether the room is occupied and should be deemed "on" or "off":

1) Unknown—occurs at startup only and will be changed to one of the other states quickly.
2) Occupied—motion has been detected in the room recently and the room is in some sort of "on" mode.
3) Maybe Unoccupied—an entry/exit sensor has been activated recently for the room. The room is still in some sort of "on" mode, but the room will time out reasonably quickly.
4) Recently Unoccupied—the room that may have been recently occupied is not now occupied, and is in an "off" mode. If someone re-enters the room within a very short predetermined period of time, the room will return to its previous "room mode".
5) Unoccupied—the room is not occupied and in an "off" mode. When someone enters the room, this room will get its "room mode" from the room the person entered from.
6) Manually Unoccupied—someone in the room pushed some sort of button (e.g. a keypad button or light switch) to manually turn the room off. Automation is disabled for a short period after a user changes the room to the 'off' mode so the person can leave the room (otherwise, the room motion sensor 24 would detect the person and turn the room back on before he/she had a chance to leave the room).

Figure 8:
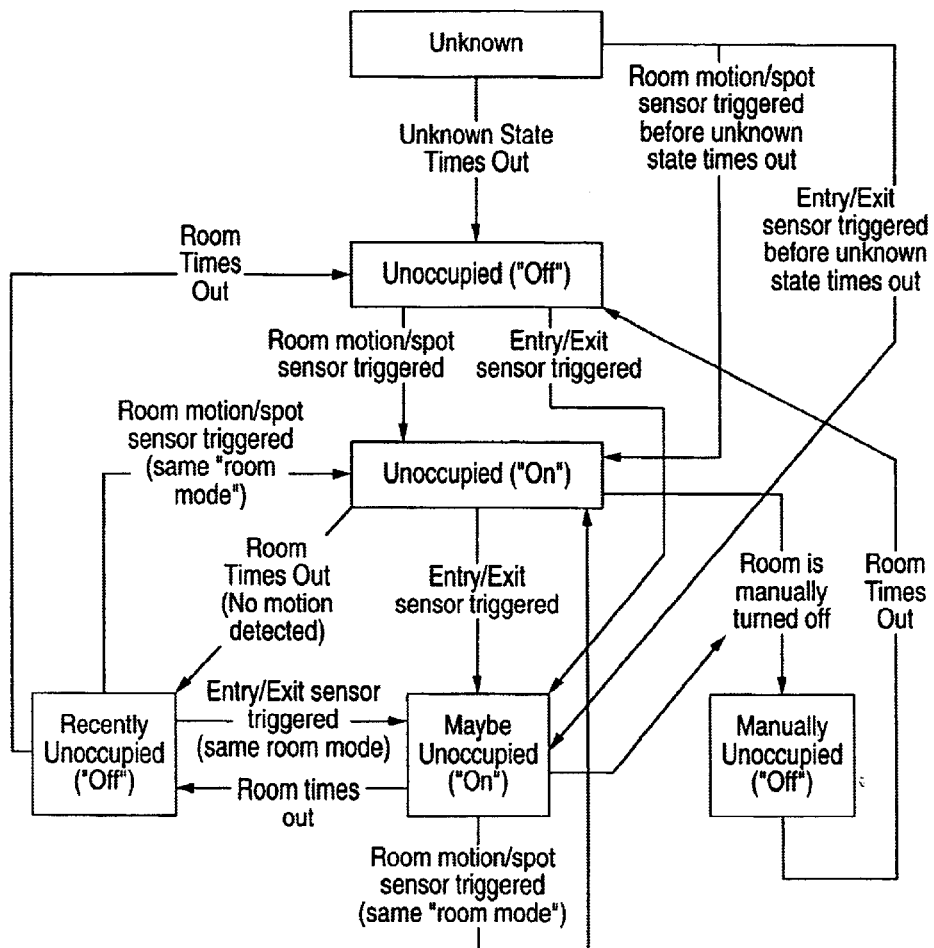
FIG. 8 is a flow diagram illustrating how a room moves between the various room states.

FIG. 8 illustrates how a room switches between room states. Upon system turn on, all rooms are temporarily in the Unknown state. If any room sensors inside the room (room motion sensor 24 or spot sensors 26) are triggered before the Unknown state times out, then the room goes directly to the Occupied state. If any Entry/Exit sensors 18 are triggered before the Unknown state times out, then the room goes directly to the Maybe Unoccupied room state. Otherwise, once the Unknown state times out, the room goes to the Unoccupied state.

The room stays in the Unoccupied state until one of the sensor(s) 10 are triggered, whereby the room goes to the Occupied room state once any room sensors inside the room are triggered (room motion or spot sensors 24/26), or the room goes to the Maybe Unoccupied state once any entry/exit sensor(s) 18 are triggered.

Once the room is in its Occupied state, it will stay in that room state until one of three things happen. First, if the room times out (meaning no room motion or spot sensors 24/26 are triggered for a predetermined time), the room goes to the Recently Unoccupied state, where it stays until this room state times out and the room goes to the Unoccupied state. However, if any room motion or spot sensors 24/26 are triggered before the Recently Unoccupied state times out, then the room returns to its Occupied state and its previous "room mode". Likewise, if any entry/exit sensors 18 are triggered before the Recently Unoccupied room state times out, then the room goes to the Maybe Unoccupied room state using its previous "room mode". Second, if any entry/exit sensor(s) 18 associated with the room are triggered while it is in the Occupied state, it goes to the Maybe Unoccupied state, where the room is still in an "on" state, but will time out relatively quickly and go to the Recently Unoccupied state. If any room motion/spot sensors 24/26 are triggered before the Maybe Unoccupied state times out, the room returns to its Occupied state and its previous "room mode". Third, if the room is manually turned off (while in either Occupied or Maybe Unoccupied room states) by the user (by pushing a keypad button or light switch), the room is turned off and goes into the Manually Unoccupied state, where automation is disabled for a short time to allow the person to leave the room. Once the Manually Unoccupied state times out, the room goes to the Unoccupied State.

Note that the room is "on" when the room is in either of the following states: Occupied and Maybe Unoccupied, and the room is "off" when it is in any of these states: Recently Unoccupied, Unoccupied, and Manually Unoccupied. When the room is in the Unknown state, it may be either "on" or "off", Cross doesn't know. When a room is "on", one or more controlled objects can be turned on by Cross. Usually when a room is "off", most or all the controlled objects are turned off (one exception would be lights left on to give the house a lived in look). The above described room states allow Cross to vary the amount of time rooms stay on depending on the likelihood that the person actually left the room. They also allow Cross to maintain "room modes" under certain circumstances, where the person only momentarily leaves the room and likely wants the room mode preserved. Finally, it allows Cross to vary the sensitivity of room sensors depending upon the likelihood that someone is still present or just entered or left the room.

Each room is also in one of 7 "Room Modes" (which determine how the controlled objects are controlled given a particular room state, and how long a room stays in a particular room state):

1) Unknown—This mode occurs at startup only and will be changed to one of the other modes quickly.
2) Normal—This is the normal mode for the room when it is in one of its "on" states. Objects in the room should be turned to their normal "object state" (depending on the house mode, controlled object state, the time of day, the outdoor ambient light, etc).
3) Path—This room mode is used at night when a person is walking around. It sets up low level path lighting and turns on any objects that the home owner wants to turn on in a given room when walking around at night.
4) Romantic—This mode creates a romantic mood for the room.
5) TV—This mode optimizes the room for watching television.
6) Reading—This mode optimizes the room for reading or working.
7) Off—In this mode, the room is off and all objects in the room are normally turned off.

For each room mode, there is a particular combination of settings for the controlled objects 12 in each room to create the desired atmosphere (e.g. low lighting and soft music for Romantic mode, bright lights for Normal mode, low level lighting for Path mode, back lighting for TV mode, desk or couch lighting for Reading mode, and all controlled objects off in Off mode). In addition to optimizing the room atmosphere for the particular activity, the room mode helps determine the time out periods for the different Room States of the room. For example, for the family room in the Normal mode, the time out period of the Occupied room state might be 3 minutes. However, that same room in the TV room mode may have a time out period of 10 minutes because people move around a lot less when they are watching TV. This mode-dependent time out methodology greatly reduces the number of times the lights turn off when they shouldn't, while minimizing the time that the lights are left on in empty rooms.

Each room also has 3 "room operational modes" (which override the normal operation of the room):

1) Sleep mode—If the room is in sleep mode, then when someone enters the room, the room will go to "Path" mode regardless of the mode of the room from which the person entered. This mode can also be used to turn off telephone ringers or intercom speakers in or adjacent to the room.
2) Special mode—If the room is in special mode, then the room will go into whatever room mode the user decides regardless of the mode of the room from which the person entered. Note that "Special mode" overrides "Sleep mode".
3) Manual mode—If the room is in manual mode, the objects in the room will not be turned on or off automatically. Therefore, the controlled objects must be manually operated. A room is either in manual mode or is operated automatically by Cross using the Room States, Modes and other Operational Modes. In Manual Mode, the rooms will still go into the appropriate room states and room modes, but none of the objects in the room will be operated automatically by Cross.

Cross continually keeps track of all room states, room modes, and room operation modes for all rooms in the house. It also runs separate timers for each room, sensor and controlled object (i.e. the time out times for any given room state can differ depending upon the type of room, the room mode, the house mode and/or the input from any status sensor 36).

It should be noted that outdoor room states, modes and operational modes can also exist to automatically activate controlled objects both inside and outside the home. For example, if a particular area outside is in the Occupied mode, lights in that area can be activated, the sprinkler systems in that area can be deactivated (to allow passage) or activated (to chase away deer or neighborhood pets), until the area is unoccupied again.

It should further be noted that Cross allows users to modify the operation of room states, room modes and room operational modes to meet particularly needs. For example, in FIG. 8, when the room is in the Unknown or Unoccupied room states, and any spot sensors are triggered, the room goes to the Occupied room state. However, the preferred embodiment has one exception: when the spot sensor that detects movement into or out of the bed is triggered, the room instead goes to the Maybe Unoccupied room state. This is desirable so that the lights in the room end up turning off quicker (once Maybe Unoccupied room state times out).

4. Controlled Object States

The fourth concept of cross is that controlled objects 12 have separate controlled object states (on, off, mode, etc.) that can vary even for the same house mode, room state and room mode. For example, if the room turns from one of its "off" states to one of its "on" states, or vice versa, then all objects in the room will be given the chance to change state as well. However, the change in state not only varies based on the type of controlled object that is being controlled, but is also based on a combination of other factors such as house mode, room state, room mode, the time of day, day of week, amount of outdoor ambient light, temperature of the room, etc. Each time a room changes room state or room mode, each controlled object 12 in the room will take one of the following actions:

1) No change—The object will not change state.
2) Turn on—The object will turn on to its default state.
3) Turn on to mode—the object will turn on to a defined state for the mode the room is.
4) Turn off—The object will turn off.

Further, the controlled object states can also cause Cross to activate a controlled object even at a time where no change in room state or room mode is occurring.

As an illustration, one common controlled object is a light in a living room where the living room is well lit during the day by natural sunlight. The light has an object state that prevents the light from coming on if the ambient light is greater than a predetermined amount. Thus, if a person walks into the living room on a sunny day while the house is in Home mode, and Cross sets the room to the Occupied room state in Normal room mode, the light is not activated. However, if the same thing were to happen on a dark cloudy day, or in the evening, the light will be activated. Further, if the room is continuously occupied in normal mode while the sun sets and the ambient light level drops, the object state will change to turn the light on even though no change in room state or mode occurs. Thus, it is the combination of house mode, room state, room mode, status sensors, and the controlled object state that together dictate when Cross activates any given controlled object.

Objects in rooms can be turned on independently of the room being in an "on" state. A further example is the outdoor lights set to automatically turn on to a medium setting when the outdoor "room" is in the off mode and the house is in party mode (provided it is dark outside), but when someone enters the driveway, the outdoor "room" turns on and the lights increase to full brightness. The lights return to medium brightness when that person enters the house and the outdoor "room" turns off again.

5. Sensors and Controlled Objects assigned to a particular room.

The fifth concept at the heart of Cross is that most sensors 10 and controlled objects 12 belong to a particular room. For example, if a sensor in the room is activated, it implies that there is someone in the room and the room should take the appropriate action (change the room state to one of the "on" states, sound an alarm if no one is home, etc).

While most objects belong to only one room, some objects may belong to two or more rooms. Specifically, entry/exit sensors 18 belong to two rooms. Lighting between rooms and whole house audio belong to more than one room as well. Further, even though an object belongs to a particular room, events that occur around the house can change its state without changing the state or mode of the room it is in, such as a decrease in the ambient light level turning on interior lights to make the house look occupied, etc.

6. Travelling Room Modes

The sixth concept at the heart of Cross is the concept that room modes "travel" from one room to the next, usually following someone walking through the house. For example, if someone is in the kitchen with the room in "Normal" mode, and that person walks into the dining room (which is presently in the Unoccupied state), then the dining room will go to the Occupied state and into the Normal mode. And, when the dining room goes into the Normal mode, each object in the dining room is given the chance to change its mode (for example, the lights may want to turn "On to Normal Mode"). Alternately, if the kitchen were in Romantic Mode and the person walks into the unoccupied dining room, then the dining room goes into the Occupied state and into the Romantic Mode as well. This concept allows the person to encounter the same room mode no matter which room they walk through. Further, different household occupants can simultaneously walk through different portions of the house using different preferred travelling room modes.

7. Room Mode Override

A seventh concept is that Cross can automatically change the behavior of a room by overriding the room mode. There are several instances of room mode override. The first instance is room mode collision, where the travelling room mode is incompatible with the existing room mode. This usually occurs when the person in a room has selected a particular room mode, and another person entering the room has selected a different (travelling) room mode. In such a case, a room mode hierarchy is established to determine what mode the room remains in (or switches to) when that new person enters the room. This room mode hierarchy can vary from home to home. For example, if the travelling room mode is Romantic, and the room being entered is currently in Normal, TV or Reading modes, then there is no change (the room stays in the mode in which it was before the new person entered the room), but if the room is currently in Path, then the room switches to Romantic mode. Depending on the circumstances, the traveling room mode may override the original room mode, the original room mode may override the travelling room mode, or both the original and travelling room modes get overridden in favor of a third room mode. Alternately, Cross can be set to suppress room mode override when room modes collide, and instead operate on a "first in" basis where the original room mode is never overridden by a travelling room mode.

A second instance of room mode override involves the room operational modes (Sleep mode, Special mode, Manual mode), as discussed above, which always override the travelling room mode. For example, if someone walks late at night from the kitchen (in Normal mode) into a bedroom (in Sleep mode), then the bedroom would go to Path mode, not Normal mode.

A third instance of room mode override involves "override sensor triggering" in response to certain sensor signals. For example, if a bedroom is in "Romantic" mode with the lights down very low, and then a motion or spot sensor in the hallway outside of that bedroom is activated, then the bedroom automatically switches to "Normal" mode with the lights turning up to full brightness. This automatic change in behavior in the room is independent of the room mode in the hallway, and indicates that someone may be on their way into the bedroom and that the people inside the bedroom should be notified. Another example is when outdoor sensors or window sensors are triggered late at night, and Cross switches certain rooms and/or outdoor areas to Normal mode to indicate the presence of someone outside of those rooms.

A fourth instance of room mode override occurs with the use of ID cards based on the BlueTooth wireless LAN standard. BlueTooth is being developed to provide a wireless means of synchronizing PDAs with personal computers, and, as such, has a very limited range (typically 15 feet). This limited range makes use difficult for most networking applications other than its intended application, but makes it ideal for identifying the room in which someone wearing a BlueTooth device is located. Each room has a BlueTooth sensor that is responsive to any BlueTooth card carried into the room. Based on knowing where someone is located, the room modes for each room can be customized for that person. Other features that use technology that identifies room occupants can include the ability to direct telephone and intercom calls to that room only, transmitting calendar events for that person from Cross to the speakers in that room (via voice synthesis), etc.

A fifth instance of room mode override involves a timer that changes room modes based on the time of day. For example, bedrooms go into "Sleeping Mode" at some time in the evening and stay in that mode until some time in the morning (both user selectable on a room-by-room basis). Rooms can be turned on by time of day to simulate a "lived in look". As stated above, controlled objects can have controlled object states that individually vary based on the time of day. However, if all the controlled objects in a given room are to be treated the same, such as all the lights, then Cross need only override the room mode during the day to prevent the lights from turning on needlessly.

A sixth instance of room mode override occurs with the amount of outdoor ambient light. Each light in each room has two thresholds for outdoor ambient light. If it is brighter outside than the "Brightness threshold", then the lights won't turn on. If the room is occupied and the light outside decreases below the "Darkness threshold" then the lights will turn on automatically. If the light outside is between the two thresholds, then no changes will occur. Each room can have different Brightness and Darkness thresholds, based upon how much light enters through the windows. Just as with the time-of-day room mode override, outdoor ambient light override can be implemented on individual controlled objects by altering the controlled object states, or on a room by room basis using room mode override.

8. Local Control

An eighth concept at the heart of Cross is that the controlled objects can be operated locally in the event that the room is set to Manual mode or if Cross should fail for any reason, using input/output devices 8 located at multiple locations in the home. This feature is important for several reasons. First, it allows visitors and others who are unfamiliar with Cross to intuitively operate the controlled objects just as they could be in a conventional house. Portions or all of the house could be set to Manual Mode when visitors are expected. Second, it provides Cross with a failure mechanism that allows those in the house to control the controlled objects locally should Cross ever fail to properly operate (i.e. either Cross is completely inoperable, or just failed to properly detect that the room was occupied). Lastly, Cross can monitor local control of the controlled objects and modify room modes or operate other devices accordingly (for example, touching a light switch multiple times within a short period of time could cause Cross to switch to Normal mode or Manually Unoccupied mode; operation of a television remote could be detected by Cross and cause it to automatically switch the room to the TV room mode. Thus, Cross automatically controls the objects in the house, but is tolerant of local control as well.

Figure 9:
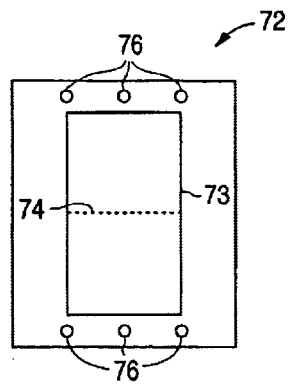
FIG. 9 is a front view of the smart switch of the present invention.

Local control can be accomplished in several ways using several types of input/output devices 8. Preferably, smart switches 72 are located in each room. These switches have the appearance of standard light switches, but offer the dual functions of local control and communications with Cross. A smart switch 72 is illustrated in FIG. 9, and has the appearance of a standard Decora light switch with a toggle member 73 that rocks inwardly about a center line 74 when manually depressed. Standard Decora switches are connected between the AC power source and the certain electrical devices such as lights to turn them on (or off) when the top (or bottom) end of the toggle member 73 is depressed. Alternately, the toggle member 73 could be a protrusion extending from the switch that rotates up or down against a spring force (similar to a standard light switch).

The smart switch 72 of the present invention is also connected to network 14, and sends a signal to Cross each time the toggle member 73 is toggled or held up or down. Thus, if the switch is toggled up once, the individual light will turn on without any change in the room mode or state (i.e. the switch acts like a normal light switch). Similarly, if the switch is toggled down once, then the individual light is turned off without any change of the room mode or state. However, smart switch 72 can be depressed repeatedly within a certain predetermined time to send commands to Cross. For example, the user toggles smart switch up twice to have Cross change the room to Normal room mode, thrice to change the room to Romantic room mode, four times to change the room to TV room mode. Likewise, the user toggles smart switch 72 down twice to change the room to Off mode, thrice to change the room to Reading room mode, four times to change the room to Path room mode, etc. Additional commands could involve combinations of up/down toggle movements (e.g. change to manual mode via toggle up, down, up, down within 3 seconds), or holding the switch in its up or down position for a period of time (e.g. to dim the individual light without changing the room mode). The preferred embodiment of the smart switch 72 includes light emitting diodes (LEDs) 76 that indicate which room mode the room is in at any given time. Each LED corresponds to one of the possible room modes, and the LED's can be inverted (meaning the active LEDs are off) to convey addition information (such as the room is in manual mode).

Smart switch 72 can be operated either manually (by the user) or automatically (by central controller 16) because each smart switch 72 is connected to the network 14. Thus, if the central controller 16 is rendered inoperative, all smart switches 72 can still be manually operated to control the light. Similarly, the smart switch 72 sends signals to the central controller 16, every time it changes the state of the device that the smart switch controls, to let the central controller 16 know than an action has taken place.

This type of smart switch is ideal because users not familiar with Cross can intuitively operate controlled objects such as lights, yet allow those familiar with Cross to communicate to the central controller 16 using the same switch and easily change the present room mode.

Other local input/output devices 8 could include standardized keypads (for example a 6 button keypad to the control the room modes or a 12 button keypad that controls the room modes and the in-room stereo), LCD screens (that are touch sensitive and/or controlled by soft keys), microphones with voice recognition algorithms that interpret user voice commands, speakers with voice synthesis algorithms that allow the central controller 16 to "talk" to the user, telephone access with push button and/or voice recognition communications with Cross, IR or HF wireless remote devices and transceivers (for example, TV remote controls and Palm Pilot devices), and spot sensors. Any of these devices can be wired directly to the controlled object, and/or be configured to send commands out over the network 14 for local operation of the controlled object.

9. Technology Independent

A ninth concept is that Cross is technology independent, meaning that Cross can work with any communications network and protocol, including the new fast, reliable communications networks 14 described above, future wireless LANs, and even the old, slow, less reliable X.10 protocol. In all cases, the "knowledge" Cross has can be used to optimize the operation of the automated house.

10. Interaction with other applications

A tenth concept is that Cross should interact with other important applications in the home. For example, Cross can interface to the home calendaring application and the world wide web so that it can announce upcoming events and major news items over the appropriate room speakers and/or televisions. It can also be controlled remotely over the internet, or by special telephone call-up modem.

11. Easy Programming

The eleventh concept of Cross is that it is easily programmed. One of the most difficult tasks of a programmer or user of conventional control systems is setting up the code to automatically respond to sensors and operate controlled objects, and, later, altering that code to accommodate changes. Further, there is no way for the programmer to simulate the operation of the house as rooms sensors are triggered. As discussed in further detail in the next section, Cross fully automates the programming process through easy to understand intuitive computer generated screens, which supply a layout of the rooms and a list of all the possible types of sensors and controlled objects. To program Cross, the user need only perform the following basic steps:

i) Define the basic room structure of the house by drawing out a basic layout of the house using standard graphic tools, or alternatively, importing the layout of the house from standard home design CAD programs.

ii) For each room, define its type. Cross provides a list of all the possible rooms found in a home, so that the user simply needs to highlight the room to be defined, and then select from the list which type of room it should be classified under. The room's default attributes will be based on the type of room selected, whereafter the user can change the room attributes as needed.

iii) Define the sensors 10 in each room. Each sensor 10 has a unique address or hub port associated with it on the control/sensor network 52. Defining a sensor 10 is accomplished by highlighting the room or doorway in which the sensor is located, identifying the sensor address/port, and selecting from a list of all possible sensors types the type of sensor it is. Cross will then automatically install that sensor 10 in the selected room/doorway, and illustrate the installed sensor using an icon unique to that type of sensor in the appropriate room. The sensor's default attributes coincide with the type of sensor selected, which can be modified by the user as needed.

There are two ways to create an address for a sensor. First, the sensor can have a hard coded address associated with it, usually set by moving toggle switches, whereby the user need only input the selected address to Cross. Second, Cross has a learn mode in which it generates an address when the new sensor is selected, and sends the generated address to the sensor, whereby the sensor records its new address and uses it from then on to communicate with Cross.

iv) Define the controlled objects 12 in each room. Just as with the sensors 10, each controlled object 12 has a unique address or hub port associated with it on the control/sensor network 52. Defining a controlled object 12 is accomplished by highlighting the room or doorway in which the controlled object is located, identifying the controlled object address/port, and selecting from a list of all possible controlled object types the type of controlled object it is. Cross will then automatically install that controlled object 12 in the selected room/doorway, and illustrate the installed controlled object using an icon unique to that type of controlled object in the appropriate room/doorway. The controlled object's default attributes coincide with the type of controlled object selected, which can be modified by the user as needed.

Controlled objects can receive their addresses in the same two ways as the sensors described above, either using a hard coded address in the controlled object or using Cross in a learn mode to send a generated address to the controlled object for use from then on.

v) Cross now has all the information necessary (location, function, control protocols, etc.) to monitor sensors and automatically operate the controlled objects. Cross assigns default attributes to each room, room sensor, and controlled object. While these attributes can be modified by the user, the default settings are based on typical preferences of users of Cross, which is why Cross is a knowledge-based application.

All of the above steps are performed using point and click commands on the basic house layout and using pull down menus, which are explained in further detail and with detailed figures in the next section.

Operation of Cross

1. Simulation

Figure 10:
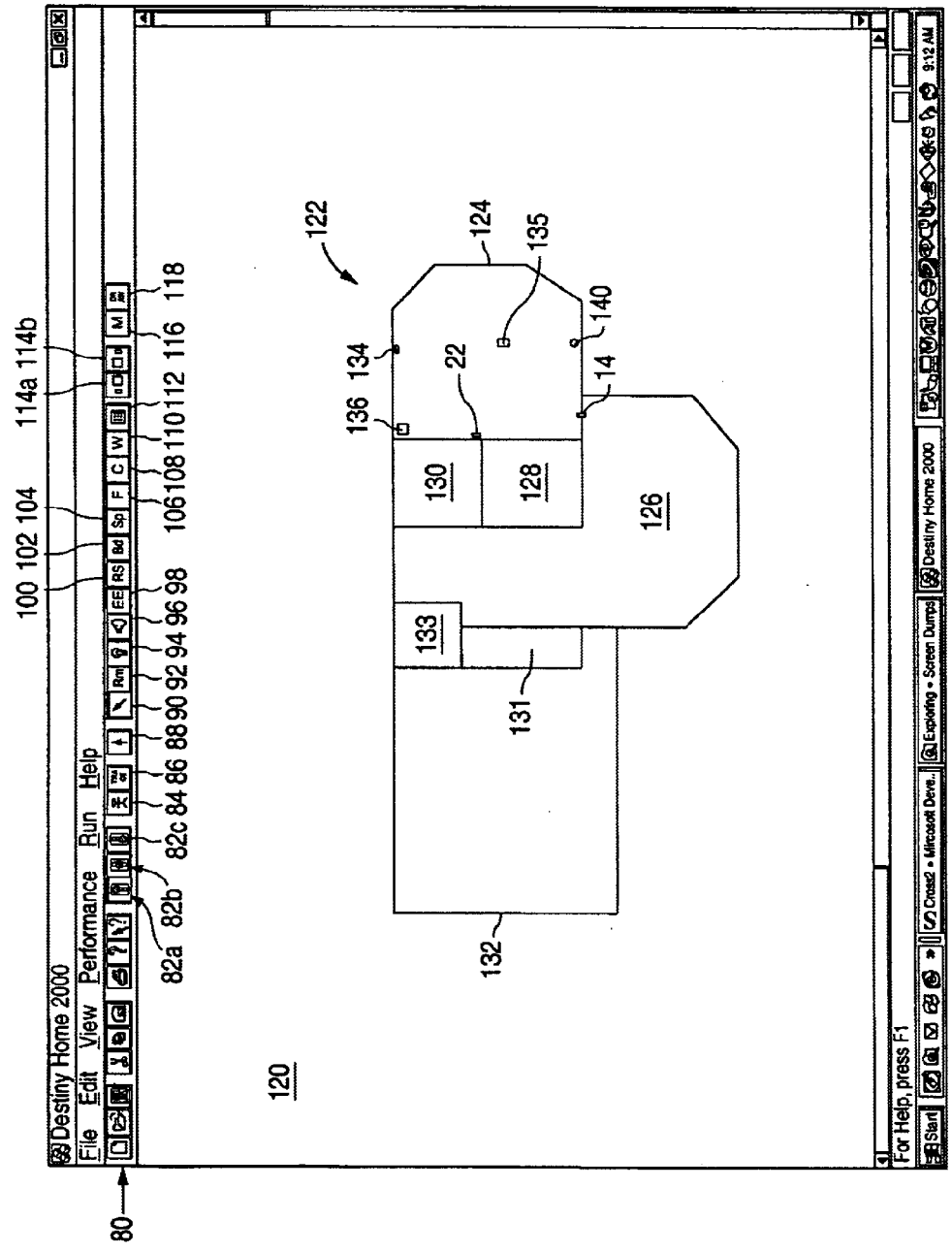
FIG. 10 is a computer generated screen showing the toolbar commands for Cross and the display of a house floor plan controlled by Cross.

The simulation and programming steps of Cross are now illustrated, starting with FIG. 10, which shows the basic computer generated screen 78 of Cross. In this screen 78, Cross provides a custom toolbar 80 that includes the following specialty keys for some of the more basic functions: operation mode keys 82a, 82b, 82c, movement emulator key 84, trace key 86, multiple object creation key (!) 88, pointer key 90, room key 92, light key 94, speaker key 96, entry/exit sensor key 98, room sensor key 100, bed sensor key 102, spot sensor key 104, fireplace key 106, curtain key 108, window key (W) 110, keypad key 112, magnification/demagnification keys 114a and 114b, macros key 116, and re-draw key 118. The Cross screen 78 also includes a central area 120 in which the house floor plan is drawn.

FIG. 10 illustrates a sample floor plan 122 already drawn in central area 120, which includes a family room 124, a kitchen 126, a bathroom 128, a laundry room 130, a stairway 131 a dining room 132 and a closet 133. The color of the rooms indicate the room state of each room. In FIG. 10, all the rooms are dark gray, indicating that they are all in the Unoccupied room state. Operation mode key 82a is highlighted (the icon is a red stop light), which indicates that Cross is currently set to a partial simulation mode, in which rooms can be turned on and off manually, but no actual automated control of controlled objects occurs. Operation mode key 82b is a yellow stop light icon, and is used to set Cross to a full simulation mode that automatically operates controlled objects. Operation mode key 82*c* is a green stop light icon, and is used to set Cross to the full simulation mode, but prioritizes automated control of the home over graphical representation of the simulation mode. Sensors and controlled objects are shown in the family room 124 using icons, indicating those devices have been previously installed (a fireplace 134, an overhead light "L" 135, a keypad 136, a room motion sensor 22, a speaker 140, and an entry/exit sensor 14 in the doorway between the family room 124 and kitchen 126—entry/exit sensors placed at the border between rooms define the interior doorways of the house). For the sake of simplifying the figures, it should be assumed for the purposes of this section that each room contains at least one room motion sensor 24 controlled objects, and each doorway includes an entry/exit sensor 14, even though not explicitly shown in the figures.

Figure 11A:
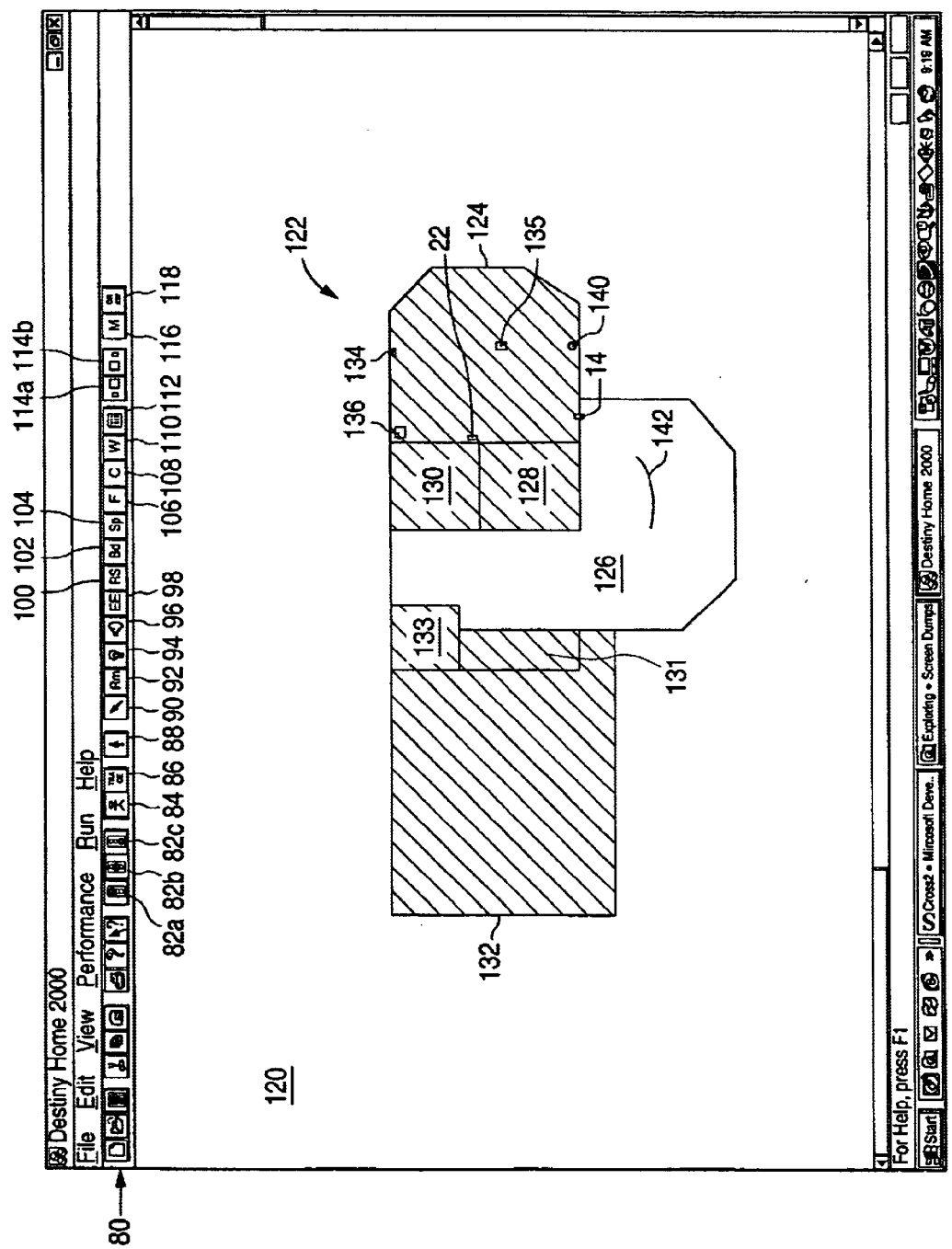
FIG. 11A is a computer generated screen showing simulated movement in the kitchen.

FIGS. 11A to 11H illustrate a user simulating movement throughout the house, and how Cross responds to those simulated movements. FIG. 11A illustrates two actions made by the user. First, operation mode key 82*b* has been activated (i.e. by placing the cursor over the icon and clicking the mouse). This activates the full simulation mode of Cross, whereby Cross simulates room state changes on floor plan 122 as certain sensors are triggered, and actively controls the installed controlled objects. Second, the user has activated the movement emulator key 84, which allows the user to trace paths of movement throughout the floor plan 122 and see how Cross would respond if that same movement were actually detected in the house. In FIG. 11A, the user has clicked and dragged a path of movement 142 in the kitchen 126 to trigger the room motion sensor(s) in that room. In response to the detected movement, Cross changes the kitchen 126 from the Unoccupied room state (dark gray) to the Occupied room state (white).

Figure 11B:
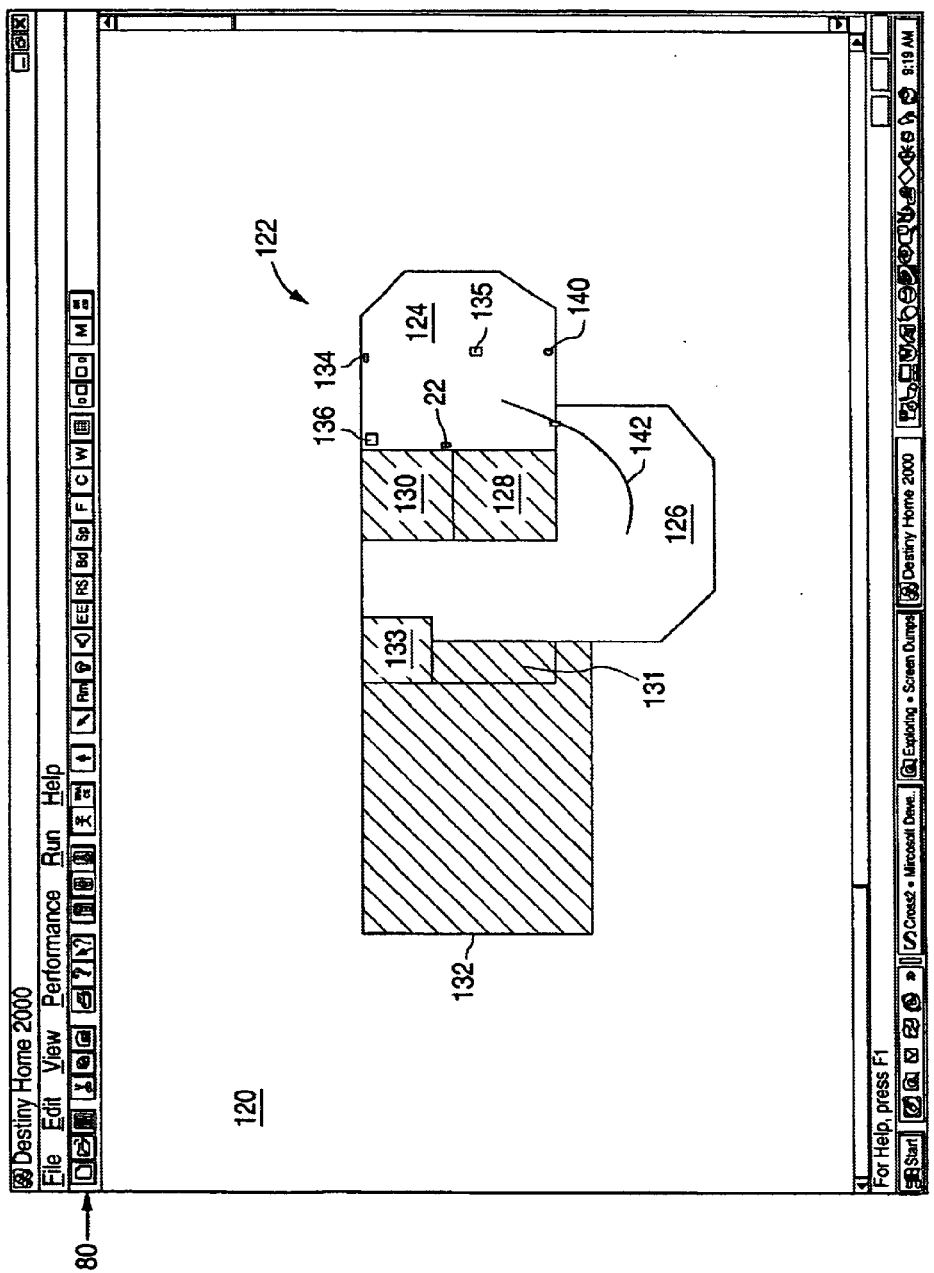
FIG. 11B is a computer generated screen showing simulated movement into the family room.
Figure 11C:
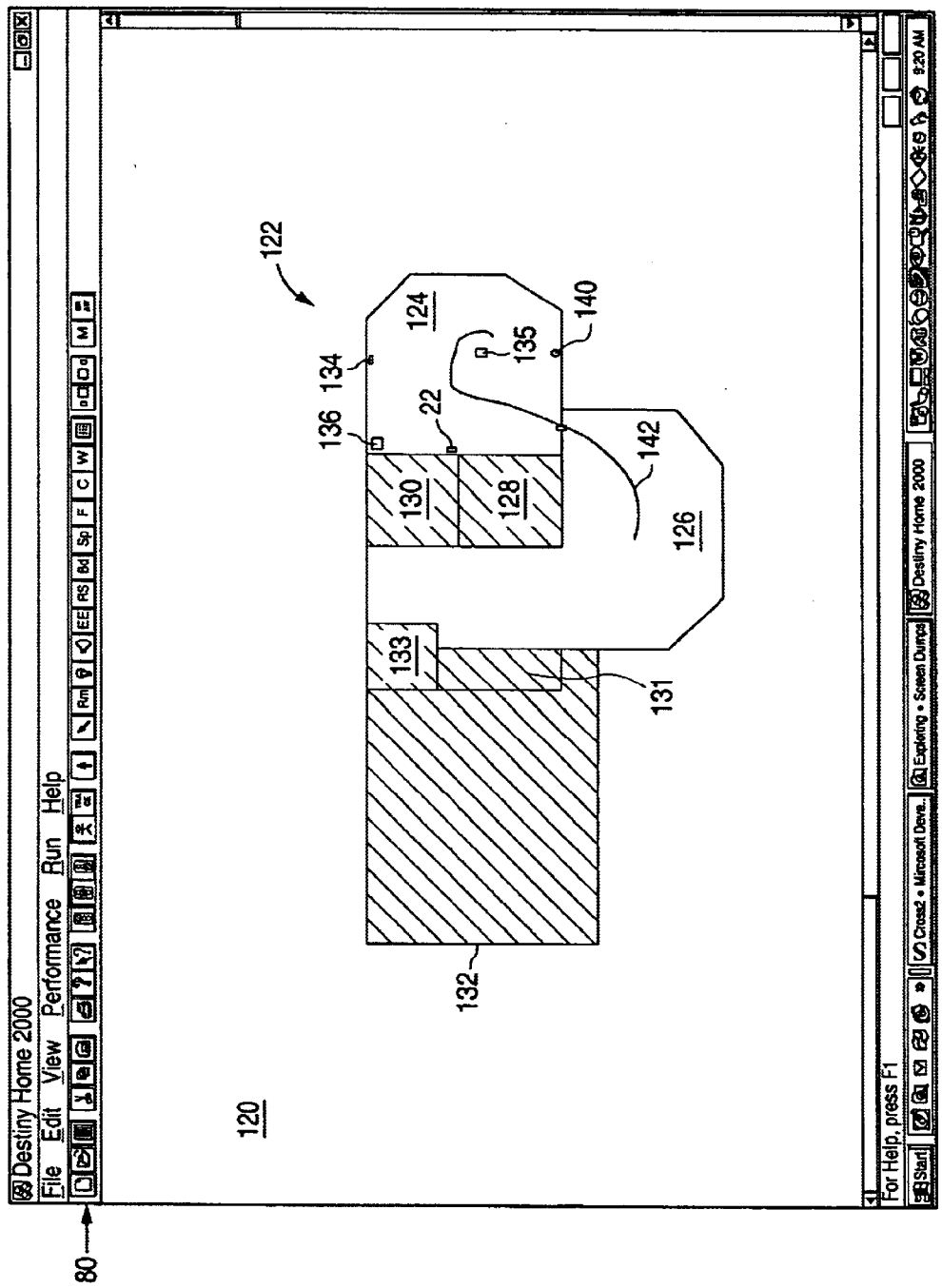
FIG. 11C is a computer generated screen showing additional simulated movement in the family room.
Figure 11D:
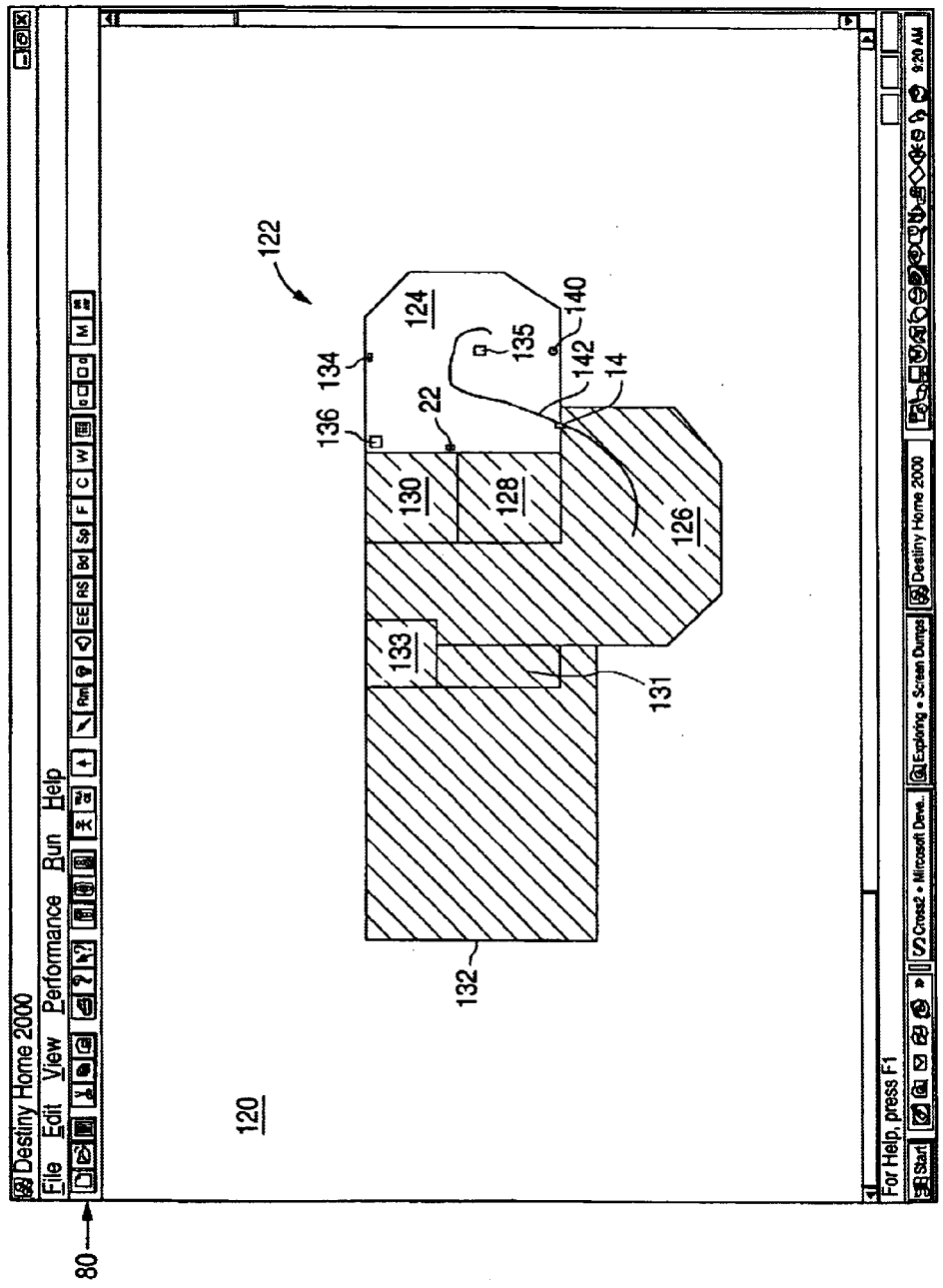
FIG. 11D is a computer generated screen showing that the kitchen has timed out and changed room states.

FIG. 11B illustrates what happens when the user continues to draw the path of movement 142 of FIG. 11A into the family room 124. Such movement triggers the entry/exit sensor 14 between the rooms. Cross responds by changing both room colors to light gray, signifying that Cross has changed both kitchen 126 and family room 124 to the Maybe Unoccupied room state. As the path of movement 142 continues further inside family room 124 (see FIG. 11C), which triggers the room motion sensor in that room, Cross changes the room state of family room 124 to the Occupied room state (white). FIG. 11D illustrates a short time later after the kitchen 126 has timed out from both the Maybe Unoccupied and Recently Unoccupied room states, and is now in the Unoccupied room state (dark gray).

Figure 11E:
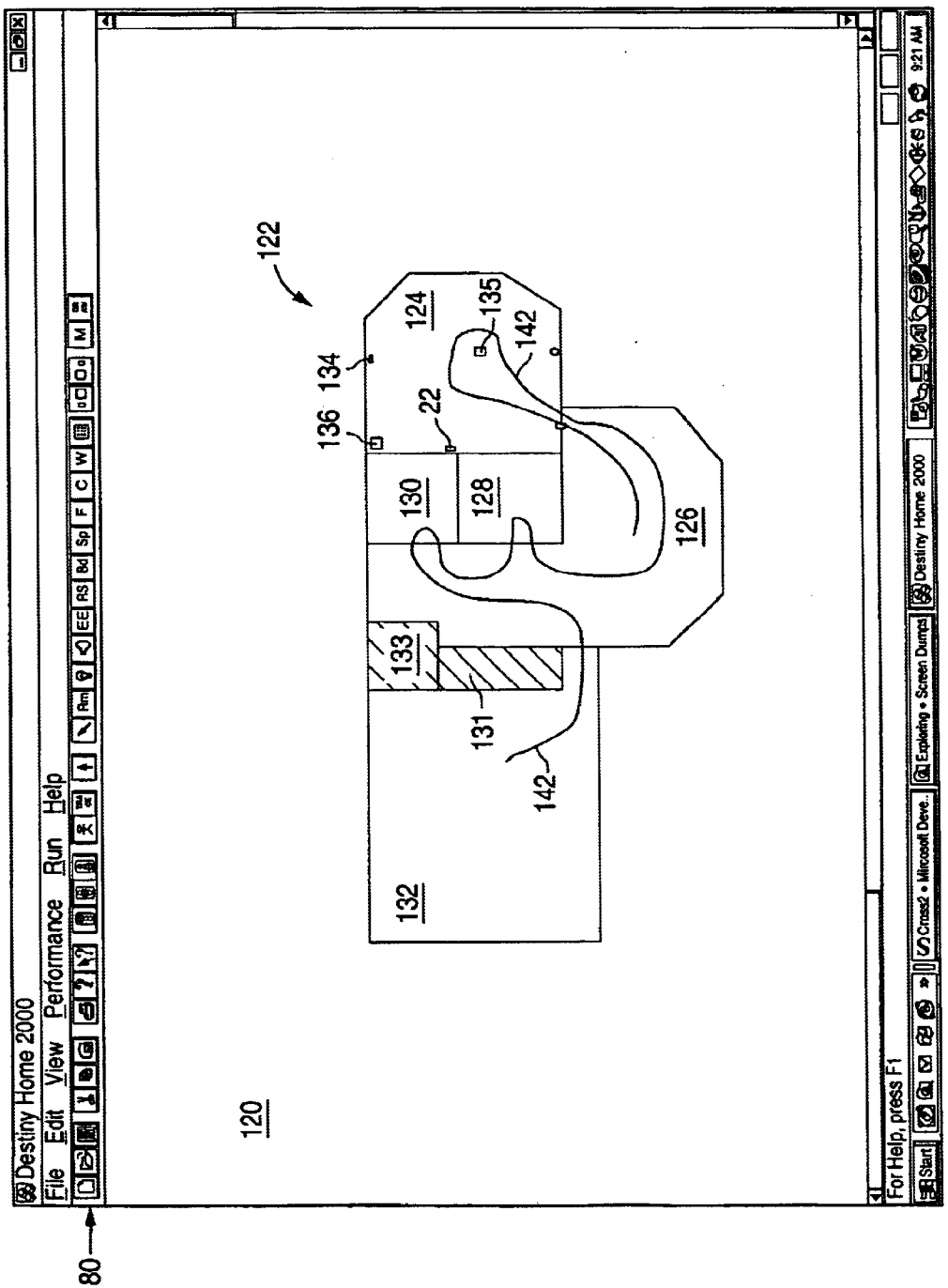
FIG. 11E is a computer generated screen showing additional simulated movement throughout all the rooms in the floor plan.
Figure 11F:
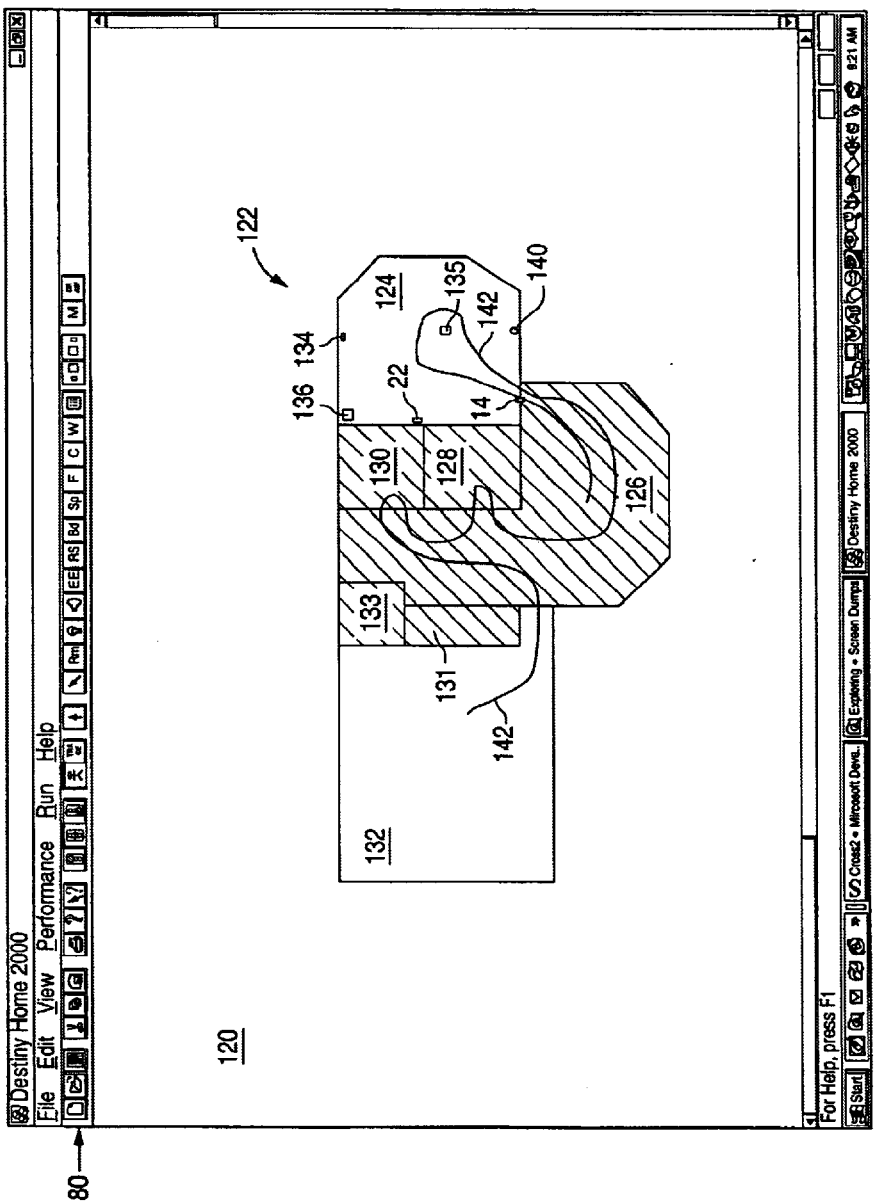
FIG. 11F is a computer generated screen showing that certain rooms have timed out and changed room states.
Figure 11G:
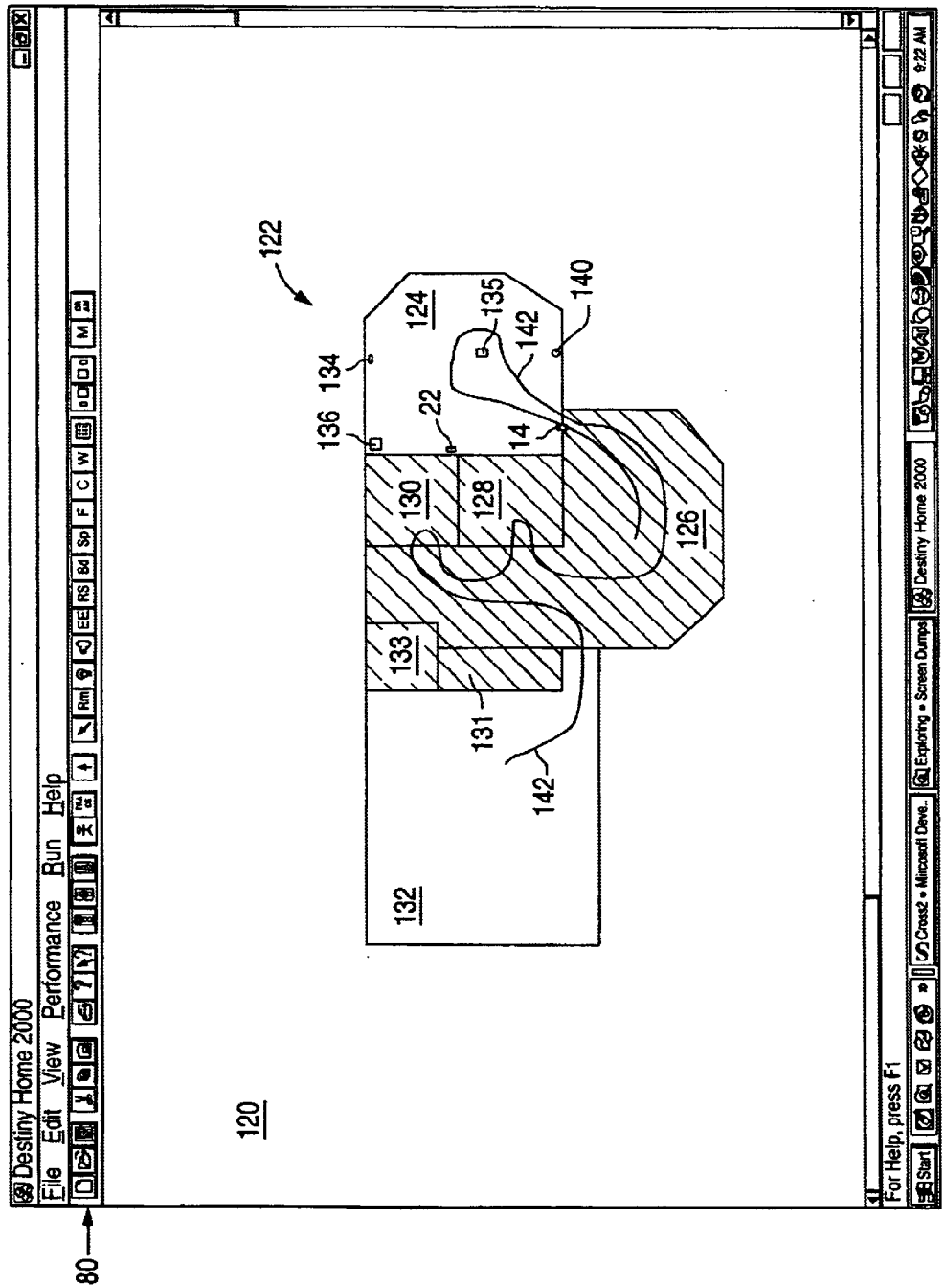
FIG. 11G is a computer generated screen showing that the bathroom has timed out and changed room states.
Figure 11H:
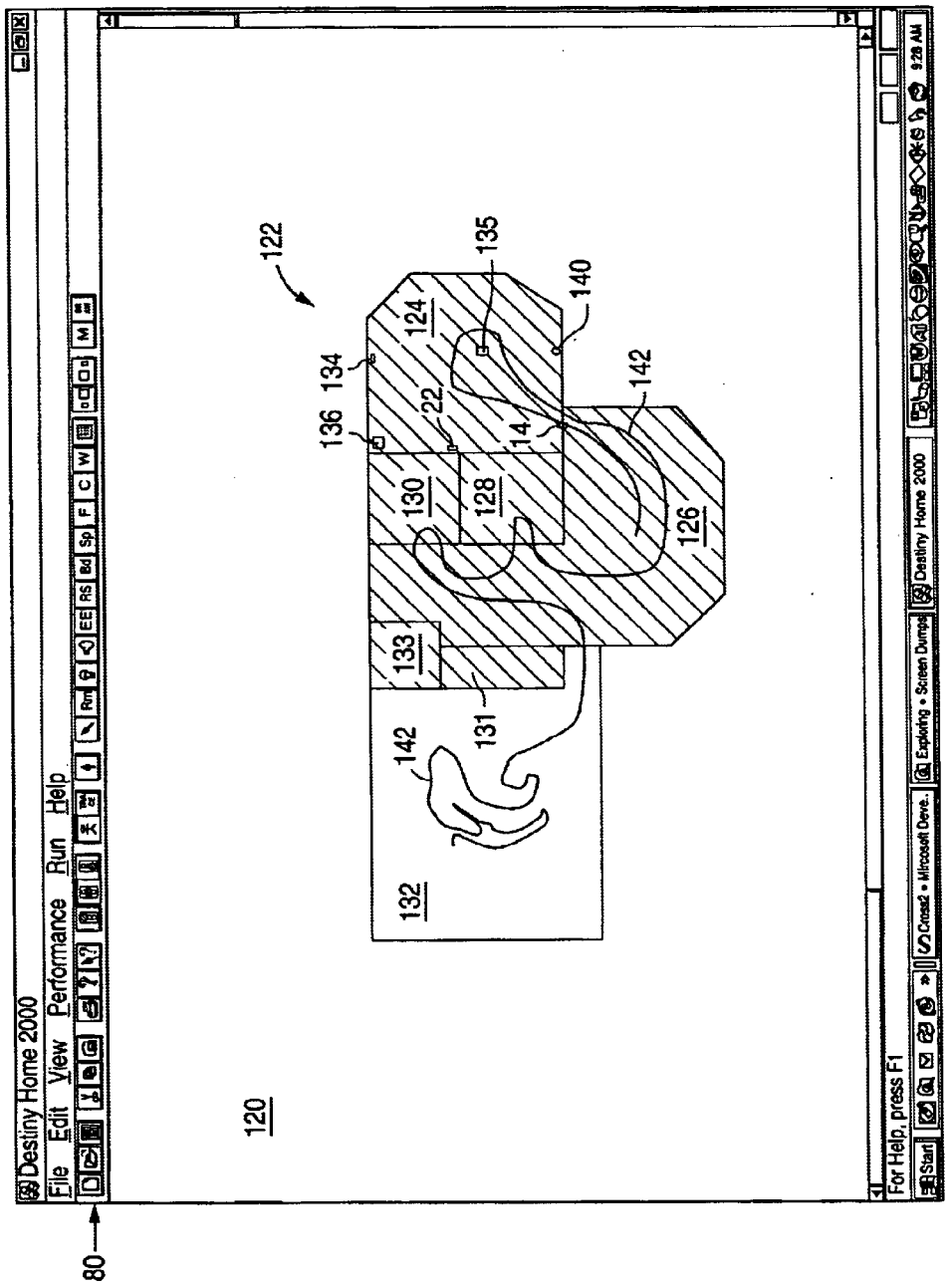
FIG. 11H is a computer generated screen showing additional simulated movement, and that the family room has timed out and changed room states.

In FIG. 11E, the user has drawn a path of movement back through the kitchen 126, bathroom 128, laundry room 130 and into the dining room 132. Each room was changed to the Occupied state (white) as its room motion sensor was triggered, and then to the Maybe Unoccupied state (light gray) as the entry/exit sensor was triggered upon leaving each room. In FIG. 11E, all the rooms are still in the Maybe Unoccupied state (light gray), except for the dining room 132 which is in the Occupied state (white). FIG. 11F illustrates the status of the rooms a short time later, after the kitchen 126 and laundry room 130 have timed out from both the Maybe Unoccupied and Recently Unoccupied room states, and are now in the Unoccupied room state (dark gray). Bathroom 128 has timed out from the Maybe Unoccupied state, but is still in the Recently Unoccupied room state (medium gray color). Family room 134 is still in its Maybe Unoccupied state (light gray). This figure illustrates that different rooms can be set with different time-out periods. Family rooms and bathrooms should be set with longer time out periods since people occupying these rooms tend to move around less. FIG. 11G illustrates the room status at still a later time, after bathroom 128 has timed out to the Unoccupied room state (dark gray). FIG. 11H illustrates even a later time, after the family room has timed out to the Unoccupied state (dark gray), and further movement in dining room 132 has kept that room in the Occupied state (white).

While the figures illustrate greyscale colors to indicate various room states, the preferred embodiment uses more vivid colors, with all rooms initially starting in the Unknown room state (green), and moving to the Occupied room state (white) when sensors are triggered. The rooms time out through the Maybe Unoccupied room state (yellow), Recently Unoccupied room state (dark yellow), and into the Unoccupied room state (very dark yellow). The Manually Unoccupied room state is also shown as the very dark yellow color. The room state colors preferably fill the rooms as shown in the figures, but can also be applied just to the outline of the rooms or to just certain portions of each room.

2. Room Addition

Figure 12A:
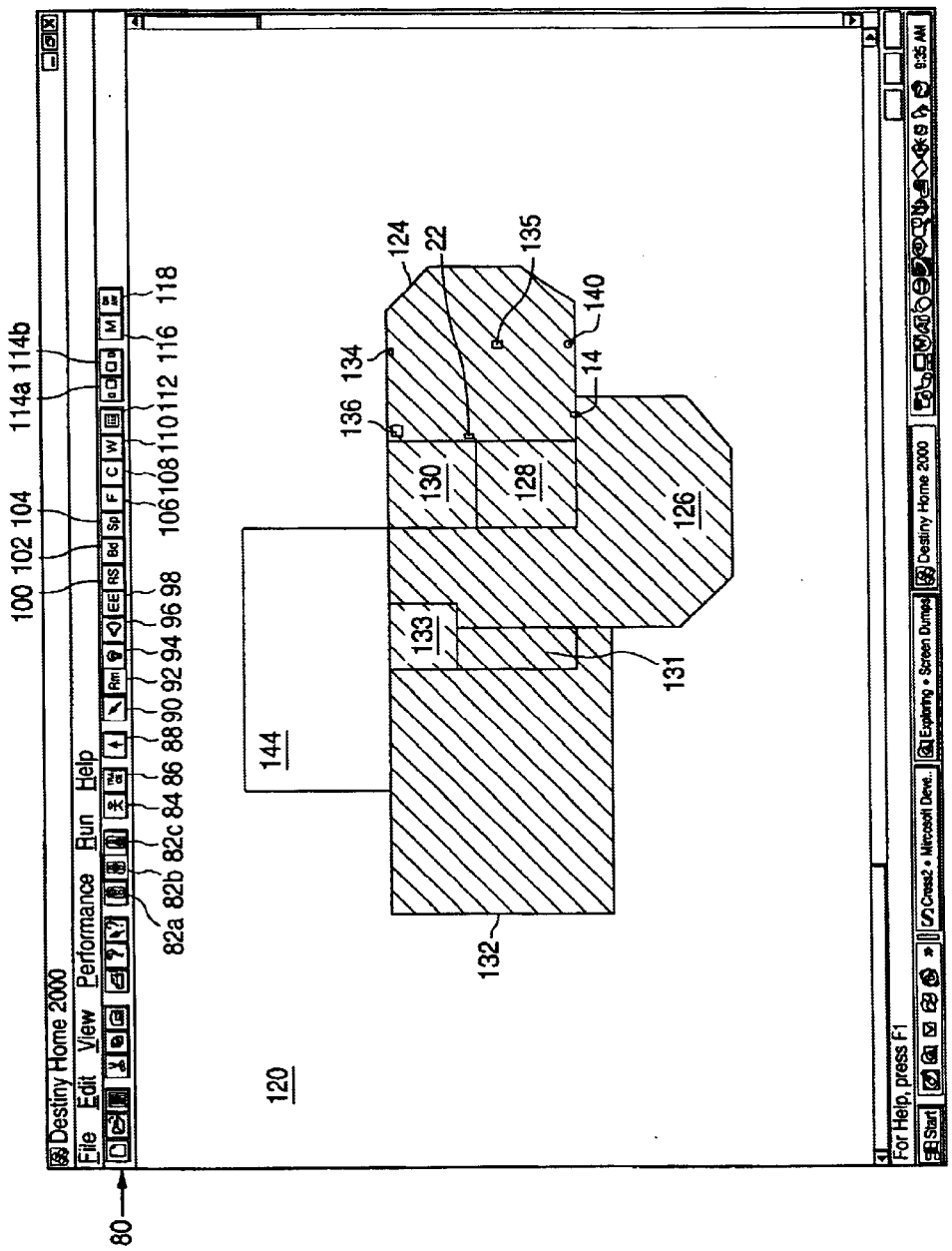
FIG. 12A is a computer generated screen showing the addition of a new room to the floor plan.
Figure 12B:
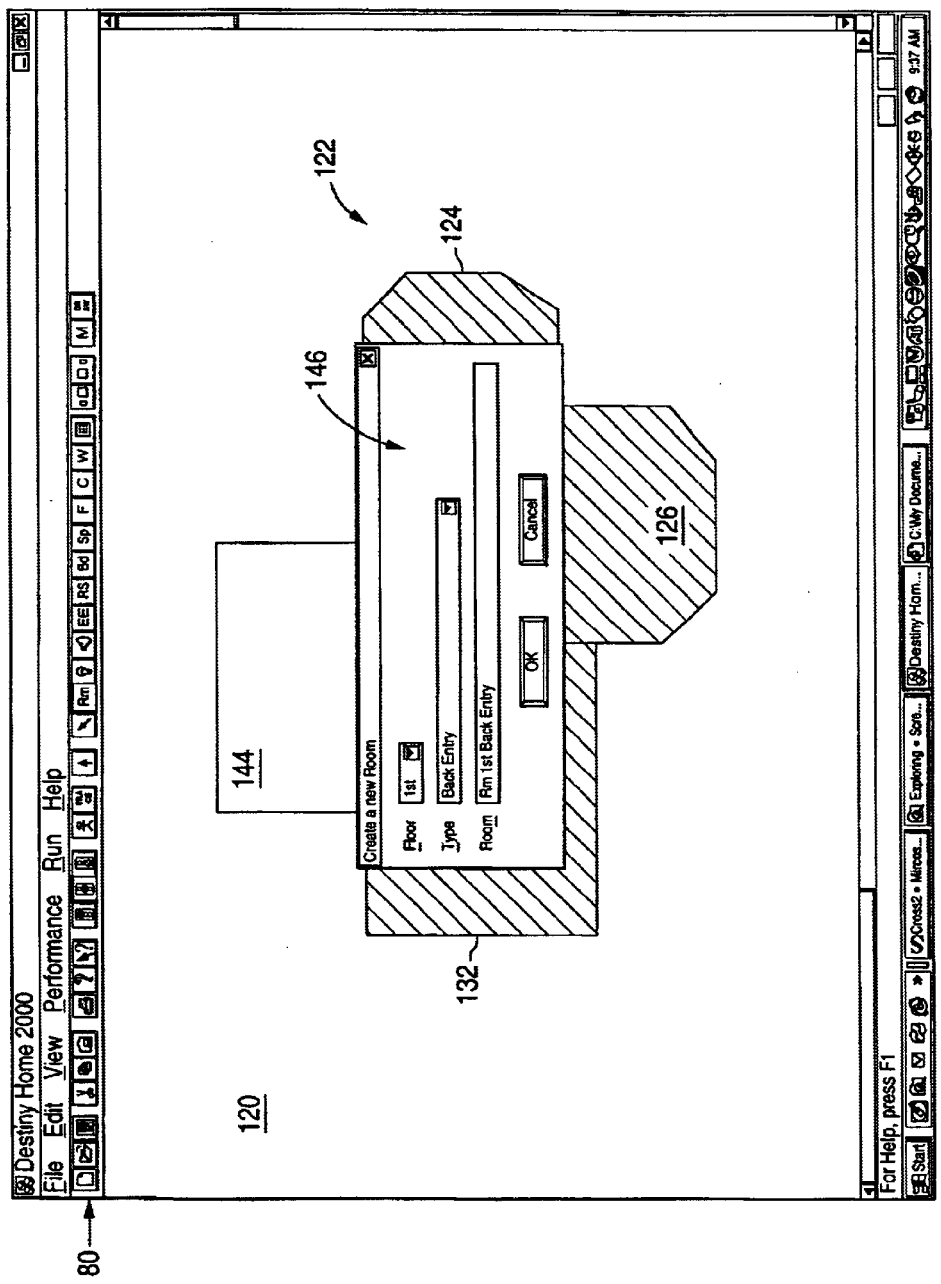
FIG. 12B is a computer generated screen showing the Create a New Room dialog box used to define the new room.
Figure 12C:
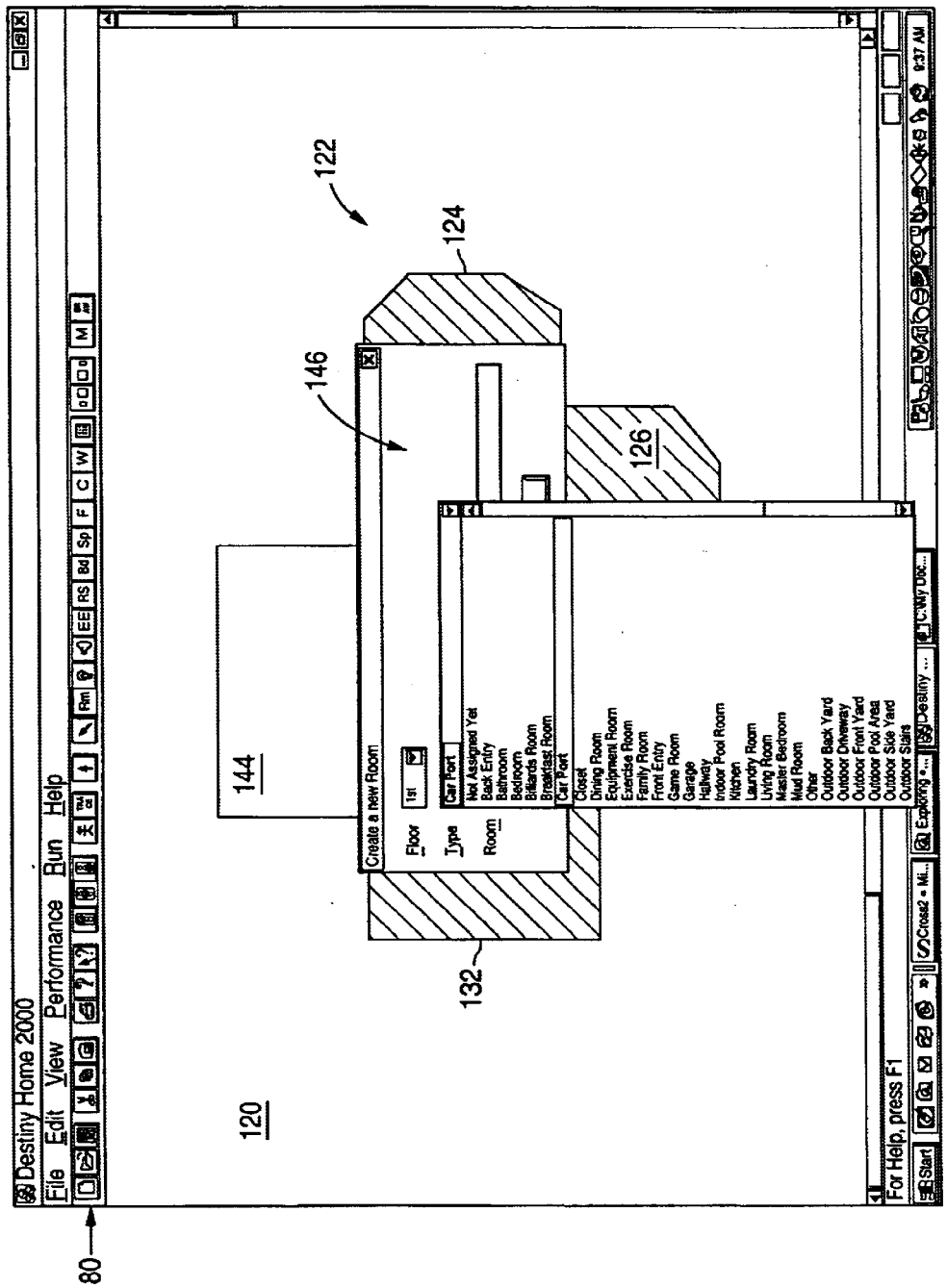
FIG. 12C is a computer generated screen showing a drop down box for the Create a New Room dialog box used to define the type of room.
Figure 12D:
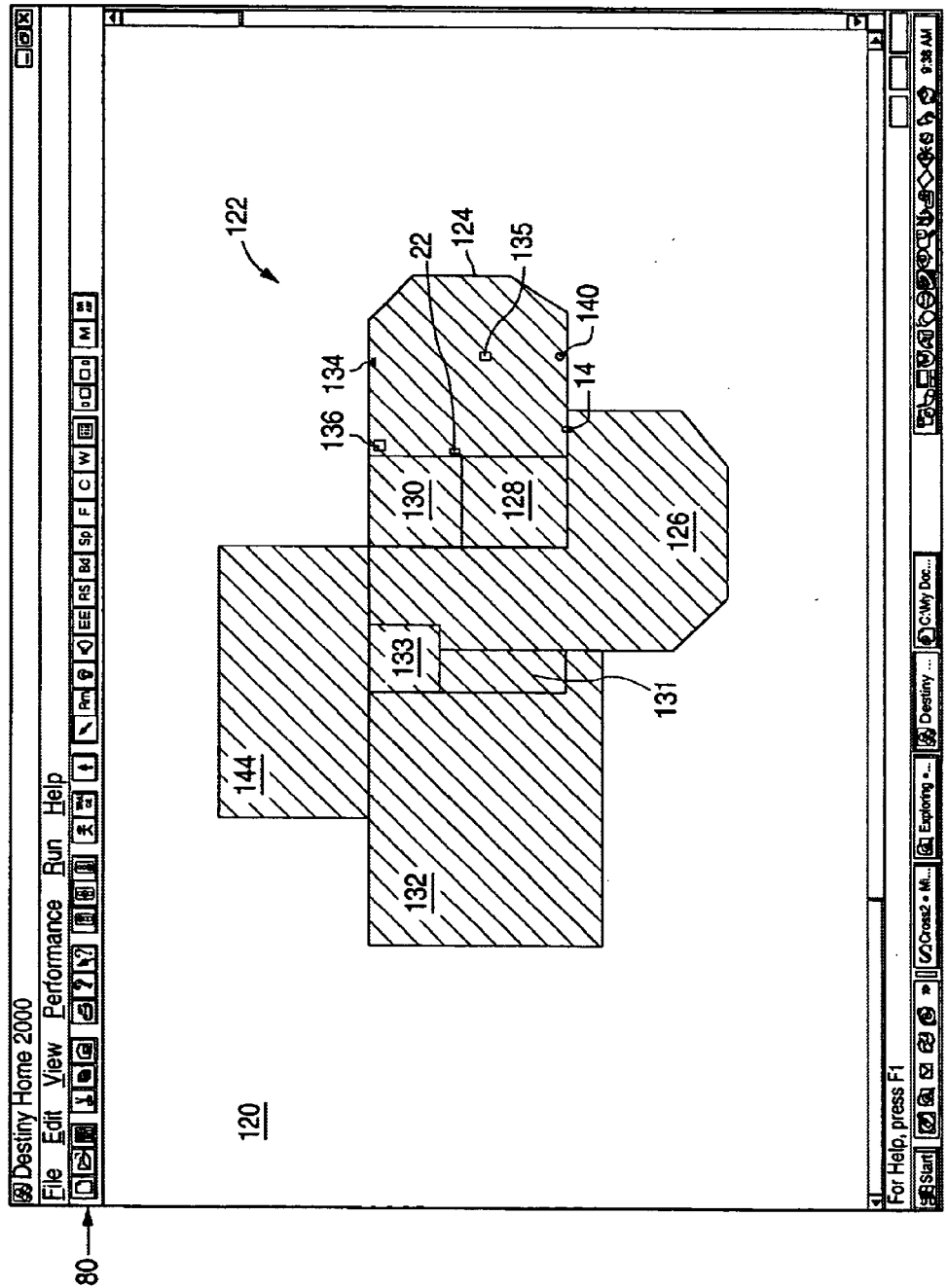
FIG. 12D is a computer generated screen showing the new room added to the floor plan.
Figure 12E:
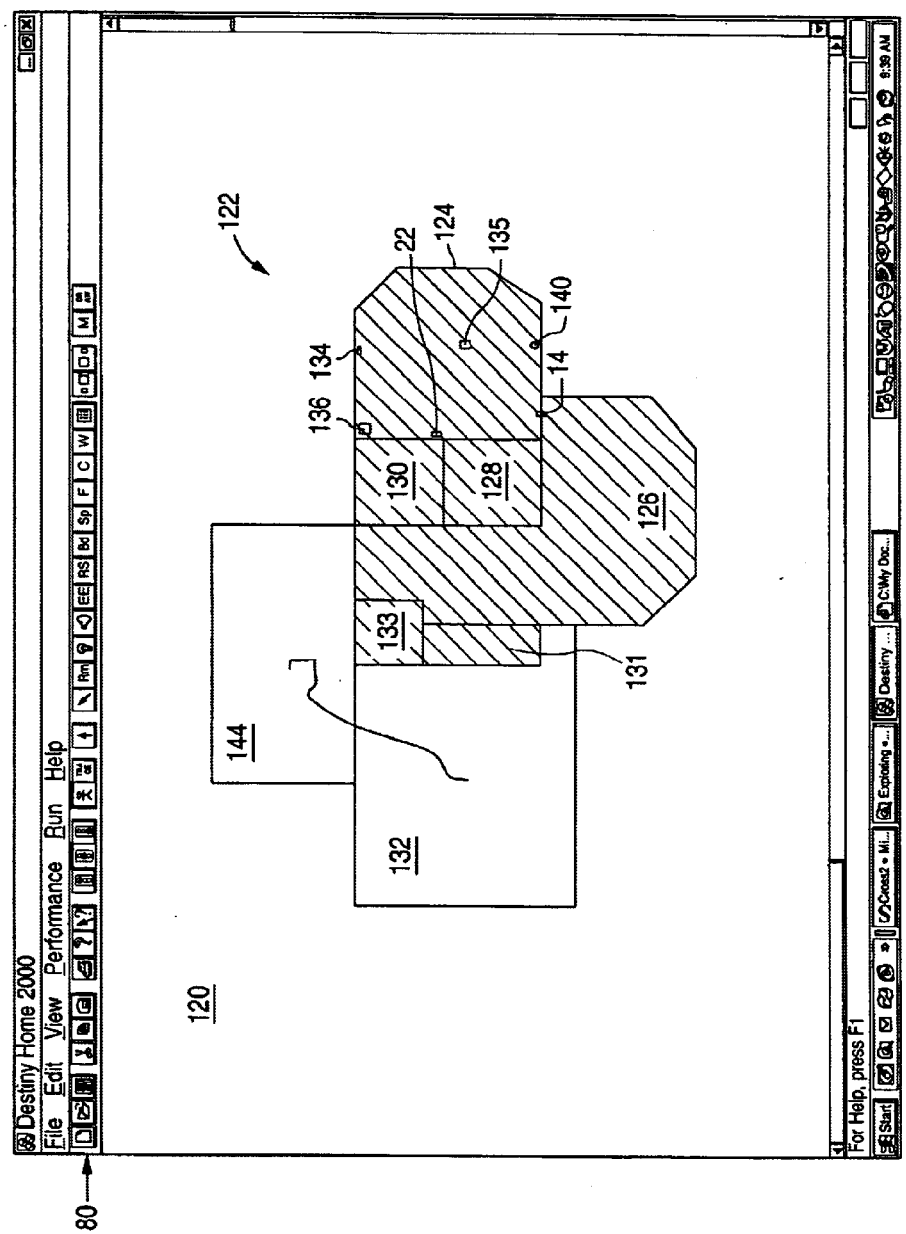
FIG. 12E is a computer generated screen showing simulated movement into the new room added to the floor plan.

FIGS. 12A–12E illustrate how to add a room to Cross. The user activates the room key 92 and traces out the new location of a new room 144 (FIG. 12A). Upon completion of the drawing, Cross opens a 'Create a New Room' dialog box 146 for defining the new room (FIG. 12B). The user can select from a list in a drop down box of many different types of rooms, each room type having a set of default attributes associated with it (FIG. 12C). Once the new room 144 is defined, it goes to the Unknown room state, which times out to the Unoccupied room state (dark gray) (FIG. 12D). The room is now defined and operational, as evidenced by its change to the Occupied room state (white) when movement from the dining room to the new room 144 is simulated by the user (FIG. 12E) (dining room 132 changes to the Maybe Unoccupied state (light gray) assuming an entry/exit sensor is installed between the rooms).

The house floor plan can be generated from scratch, room by room, in the manner just described. Alternately, rooms or entire house floor plans can be created using other graphics software program(s), such as CAD, and then generated by importing the floor plan(s) into Cross.

3. Attribute Display and Modification

Figure 13A:
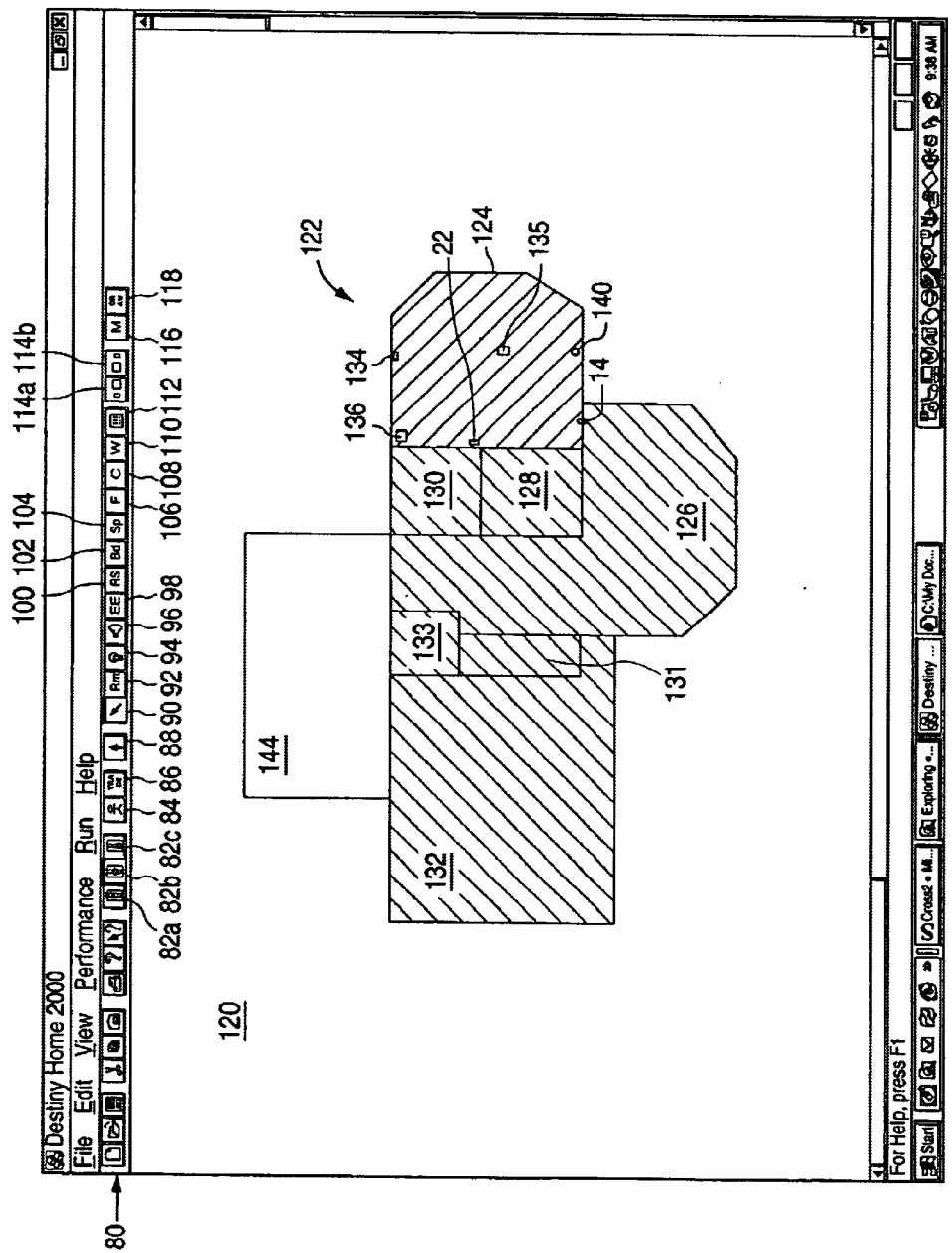
FIG. 13A is a computer generated screen showing the family room highlighted for viewing room attributes.
Figure 13B:
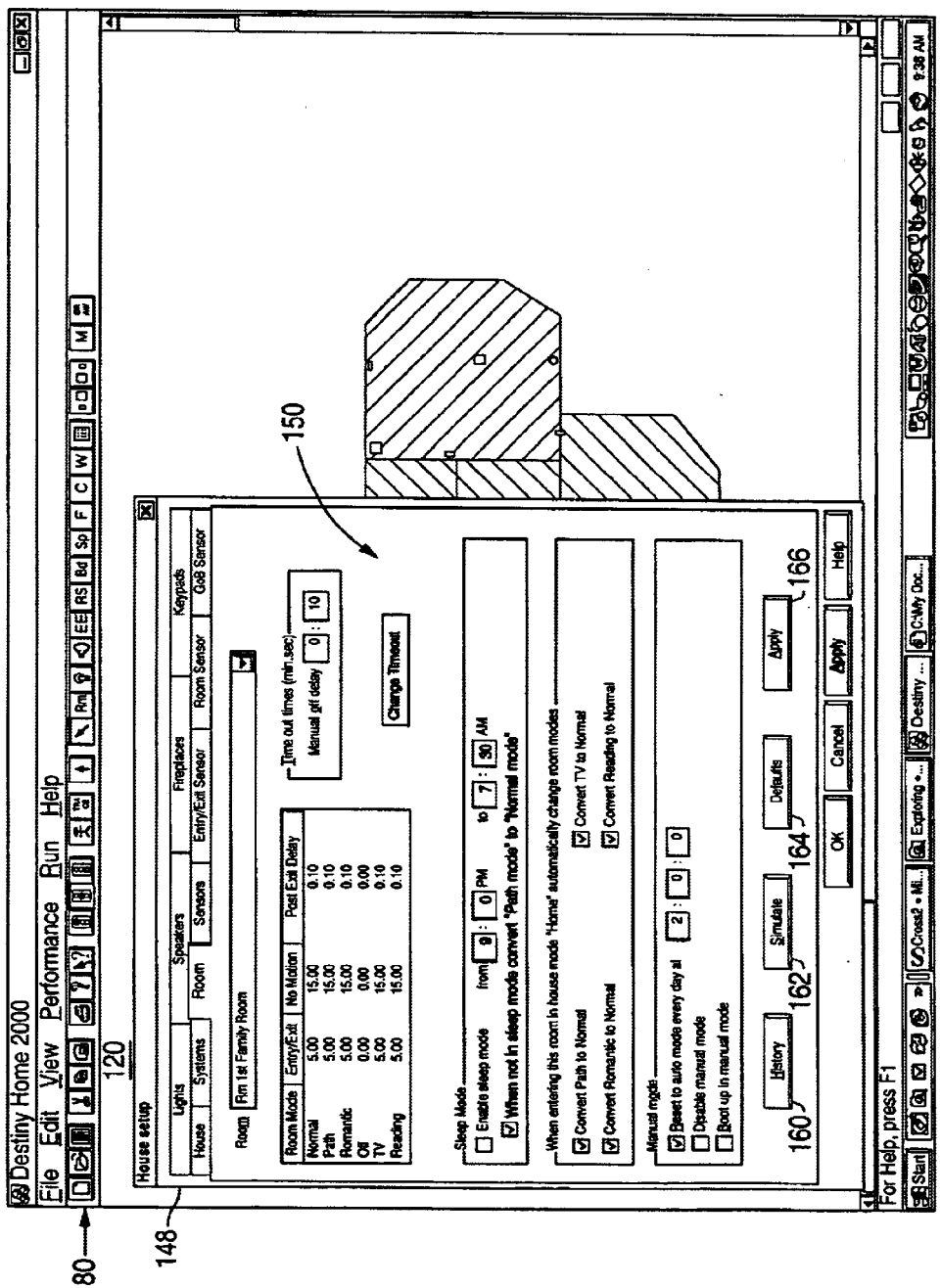
FIG. 13B is a computer generated screen showing the Room screen of the House Setup dialog box for viewing and changing room attributes.

FIGS. 13A–13F illustrate how to review and modify the attributes of rooms, sensors and controlled objects. When the user activates pointer key 90 and then double-clicks on a room (in this case the family room 124), the room is highlighted in black (or blue if in color) (FIG. 13A) and a 'House setup' dialog box 148 opens (FIG. 13B). This dialog box includes separate attribute screens for reviewing and changing the attributes for all rooms, sensors and controlled objects (e.g. the lights, speakers, fireplaces, keypads, house, systems, room, sensors, entry/exits sensors, room sensor, and bed sensors).

Figure 13C:
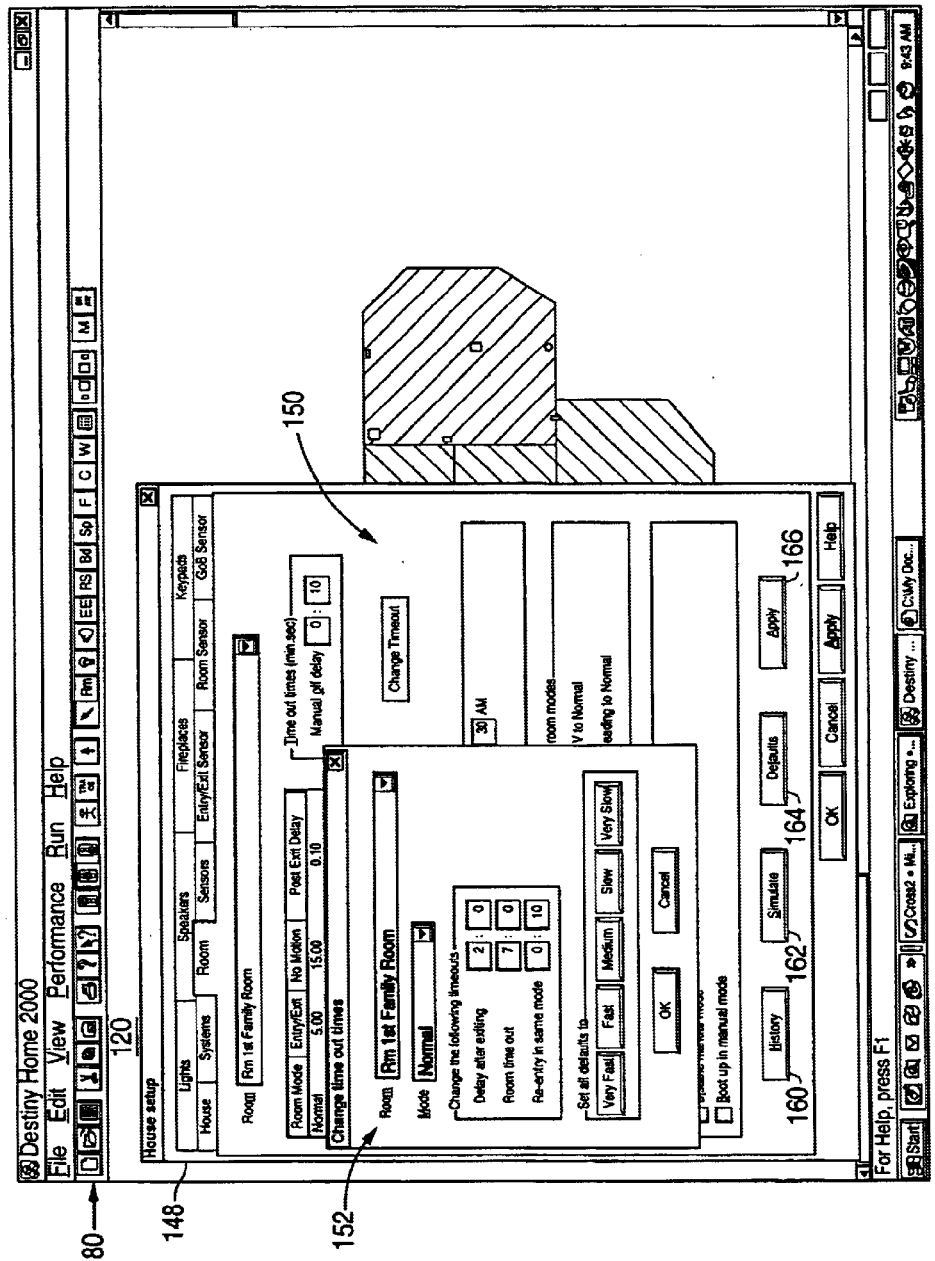
FIG. 13C is a computer generated screen showing the Change Time Out Times dialog box for changing the room time out times.

FIG. 13B illustrates the Room attribute screen 150, with the room selected by default to the room that was double-clicked (in this case the family room). For each room mode (Normal, Path, Romantic, Off, TV, Reading), separate time-out periods can be set for Entry/Exit (the length of time the room stays in the Maybe Unoccupied room state after being triggered by an entry/exit sensor), No Motion (the length of time the room stays in the Occupied room state after being triggered by a room sensor), and Post Exit Delay (the length of time the room stays in the Recently Unoccupied room state before timing out to the Unoccupied room state). This screen also allows the user to enable sleep mode for this room based on the time of day (and convert Path mode to Normal mode when not in sleep mode), to convert certain room modes to Normal room mode when entering this room (i.e. room mode override), and to disable manual mode or reset to auto mode once a day. FIG. 13C illustrates the 'Change time out times' dialog box 152 used to change the time-out periods when a room mode is highlighted and the "Change Timeouts" button is selected.

Figure 13D:
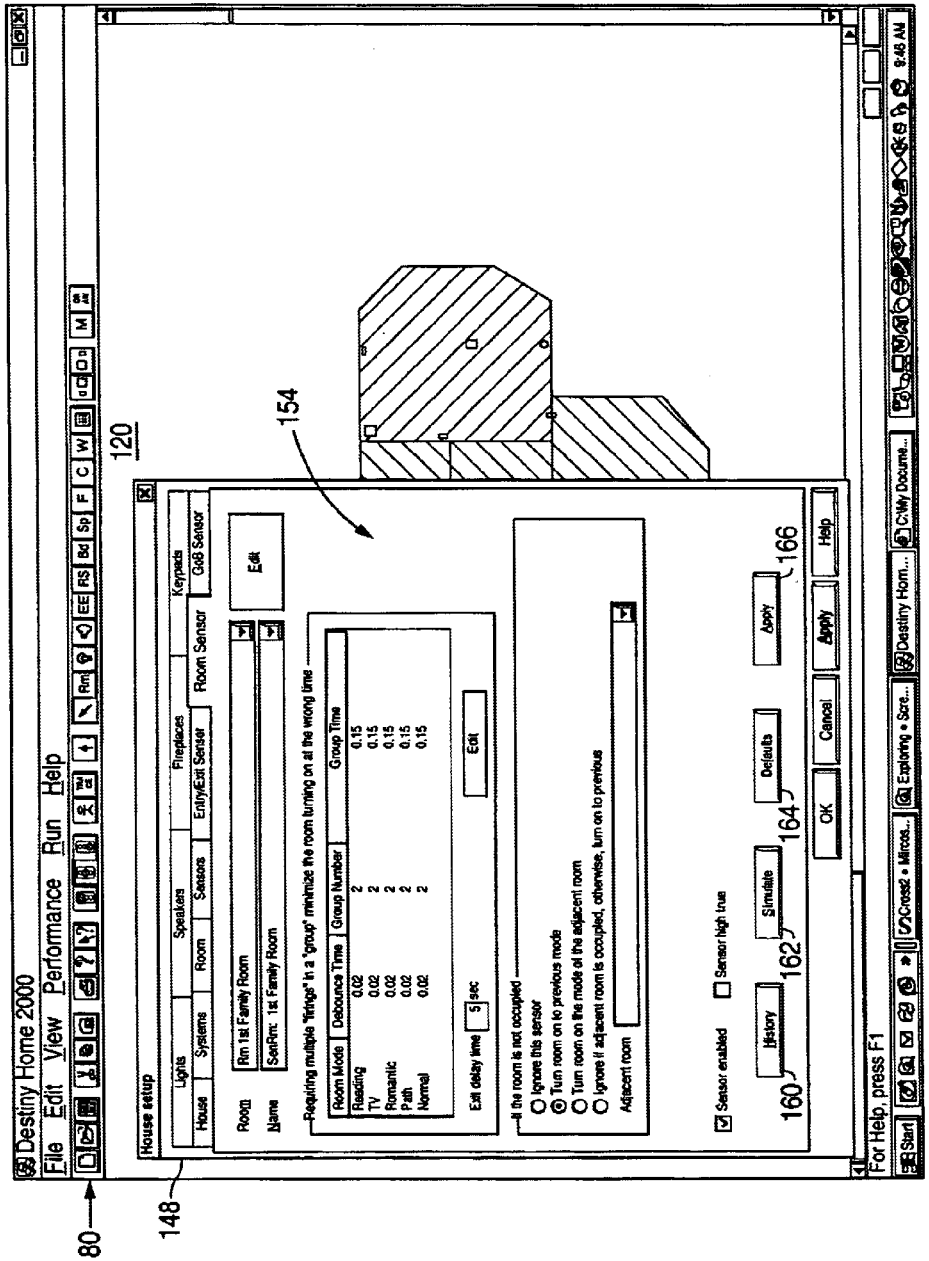
FIG. 13D is a computer generated screen showing the Room Sensor attributes screen of the House Setup dialog box.

FIG. 13D illustrates the Room Sensor attribute screen 154, which displays the Debounce Time, Group Number, and Group time (filter mechanism settings) for the room motion sensor in the selected room (e.g. family room). These values can be individually set for each possible room mode. It also gives the user the option to set the delay time for the sensor, as well as instructions to Cross for when the room is not occupied (i.e. ignore this sensor, turn room on to previous mode or mode of adjacent room, or ignore if adjacent room is occupied).

Figure 13E:
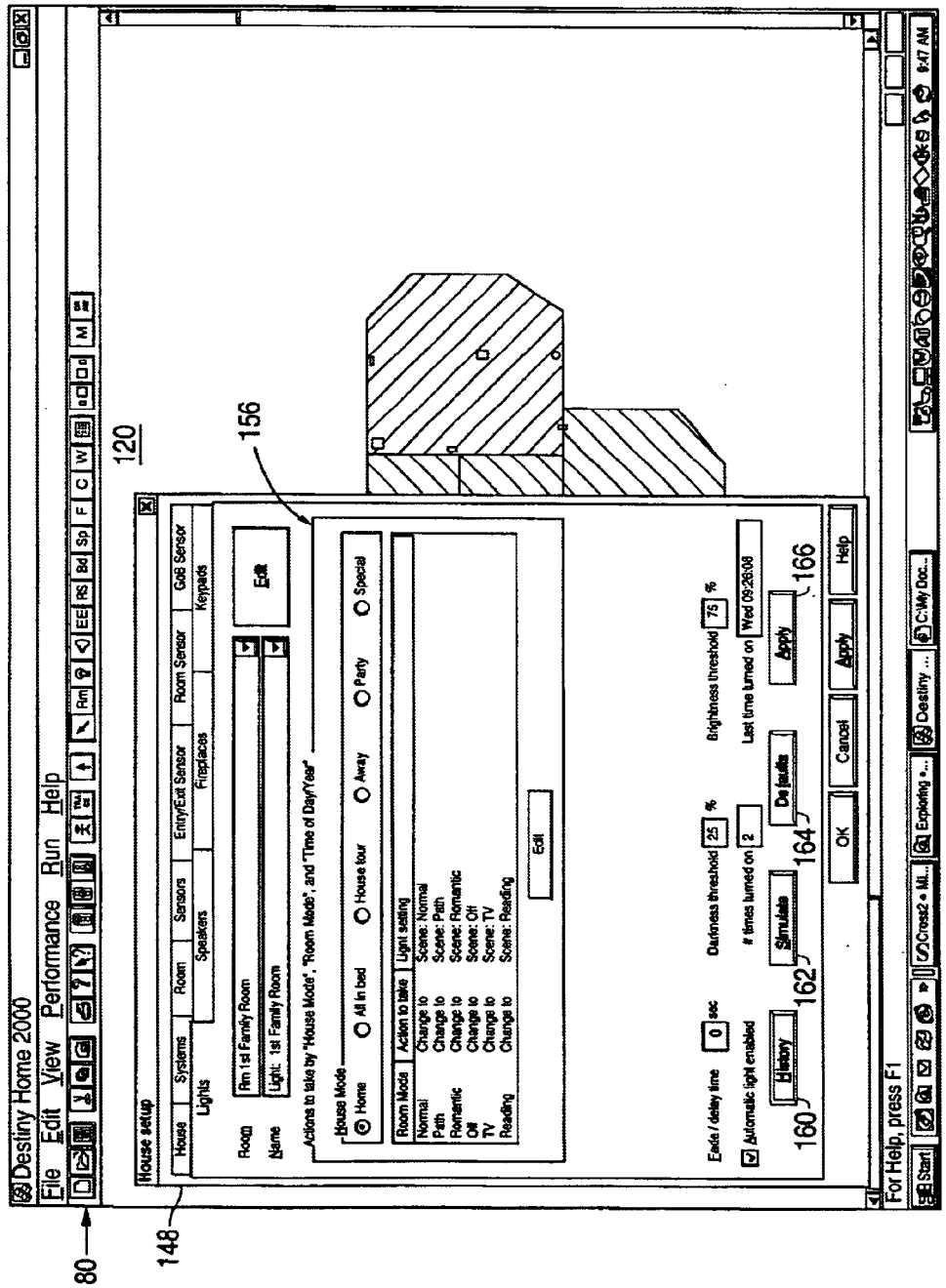
FIG. 13E is a computer generated screen showing the Lights attributes screen of the House Setup dialog box.

FIG. 13E illustrates the Lights attribute screen 156, which displays light attributes for each house mode and room mode. Each attribute can be independently changed for each light in the house. In addition, this screen allows the user to set the fade/delay time, the darkness and brightness thresholds (amount of ambient light required to turn the light on and off, respectively, in response to a light level detector (control object state)). This screen further shows the cumulative number of times the light has been turned on, and when the last time the light was turned on.

Figure 13F:
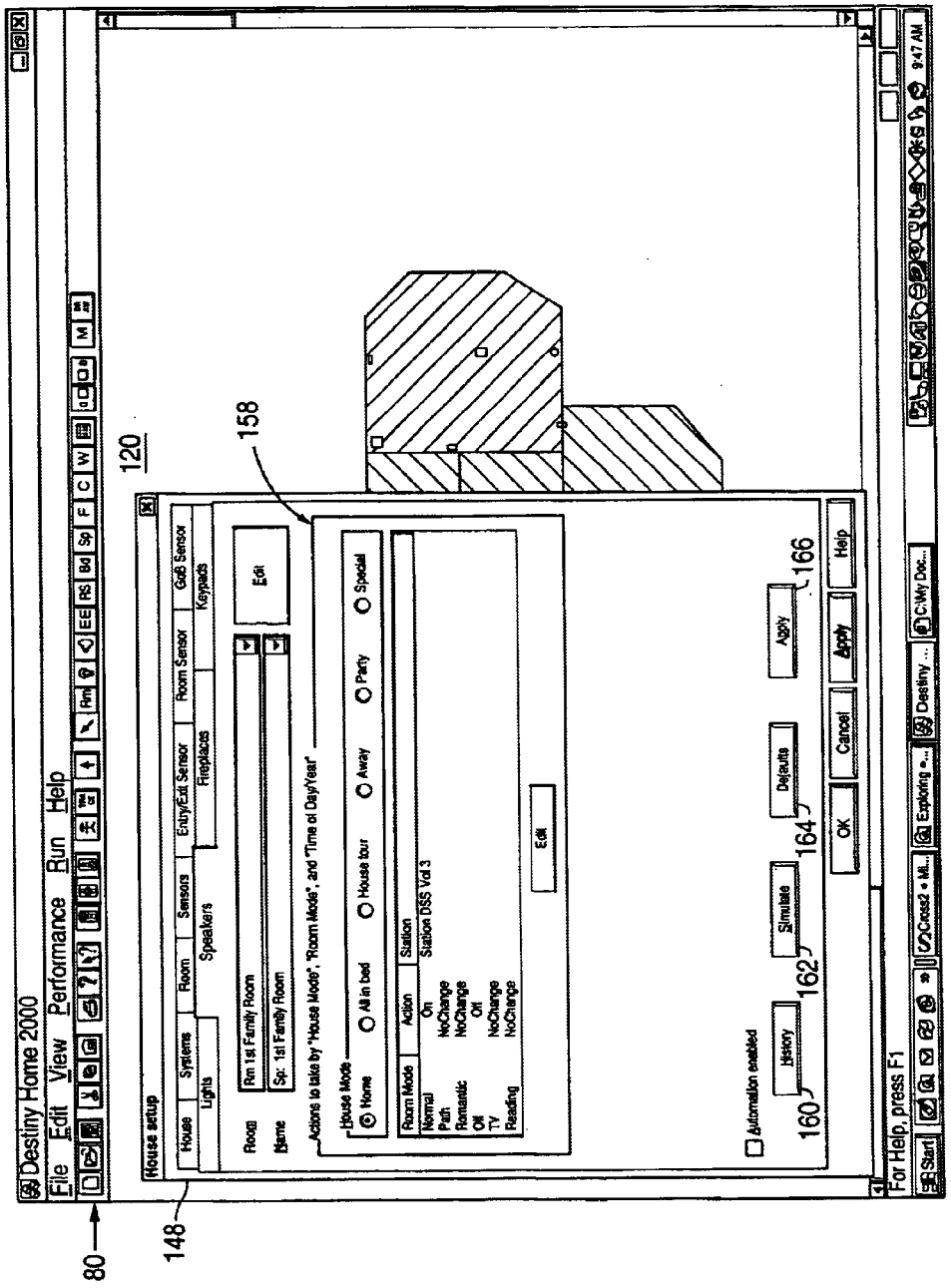
FIG. 13F is a computer generated screen showing the Speakers attributes screen of the House Setup dialog box.

FIG. 13F illustrates the Speakers attribute screen 158, which displays attributes for the speakers in the house. Speaker attributes (such as when speakers are activated and to what source) are displayed and can be individually changed for each house mode and room mode.

Similar attribute screens exist for the fireplaces, keypads, house, systems, sensors, entry/exit, and getting out of bed (GoB) sensors.

4. History and Manual Simulation

At the bottom of each of the screens in the House setup dialog box 148 are four keys: History key 160, Simulate key 162, Defaults key 164 and Apply key 166. Activating the History key 160 brings up a History dialog box 168 that lists the history of any room (i.e. each time a room changes states or modes), any sensor (i.e. each time a sensor is triggered), or any controlled object (each time a controlled object is activated). This feature provides a complete history and knowledge of all house activities. For example, Cross tracks how many times a particular light or other controlled object was turned on over its lifetime, how many hours a day the TV was on and at what times, how room states or modes changed over time, how the house was occupied over a given weekend away, or even providing verification of when a teenager arrived home late the night before. The History dialog box 162 can also be used to reenact house movements either through simulation or actual automated control, or provide remote monitoring of the home. FIGS. 14A–14D illustrate a sample History dialog box 168 for a room (family room).

Figure 14A:
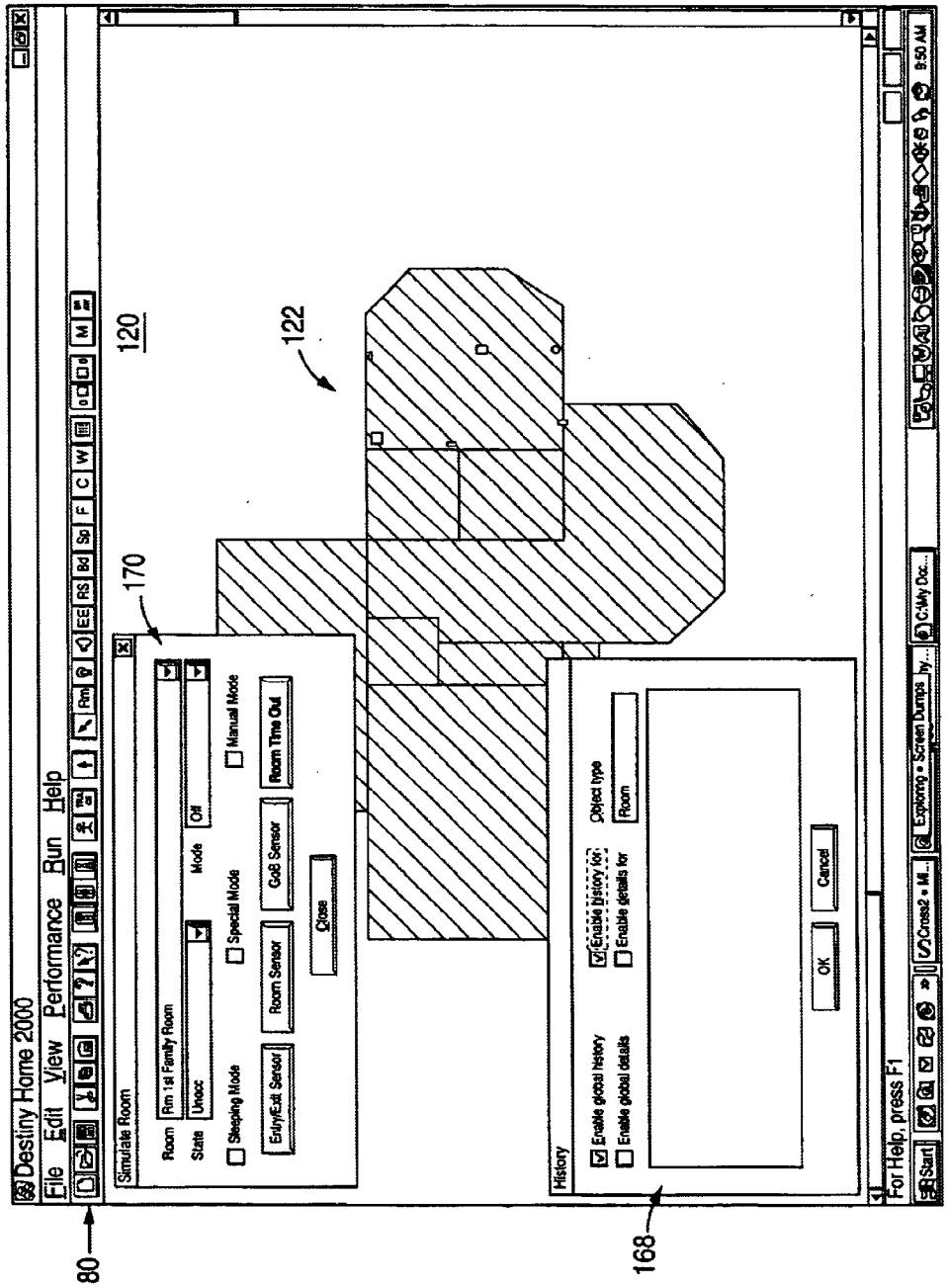
FIG. 14A is a computer generated screen showing the History and Simulate Room dialog boxes.
Figure 14B:
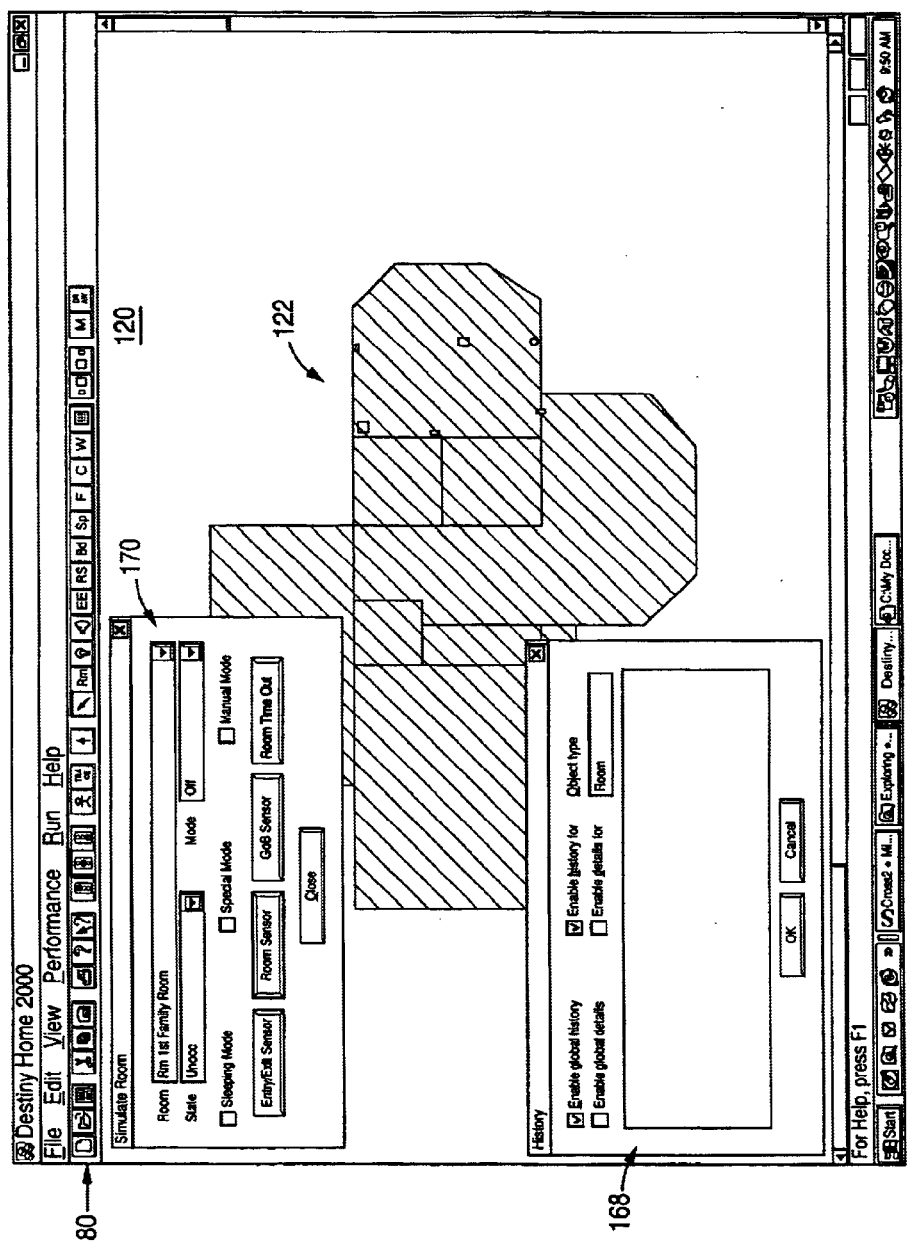
FIG. 14B is a computer generated screen showing the activation of the Room Sensor button on the Simulate Room dialog box.
Figure 14C:
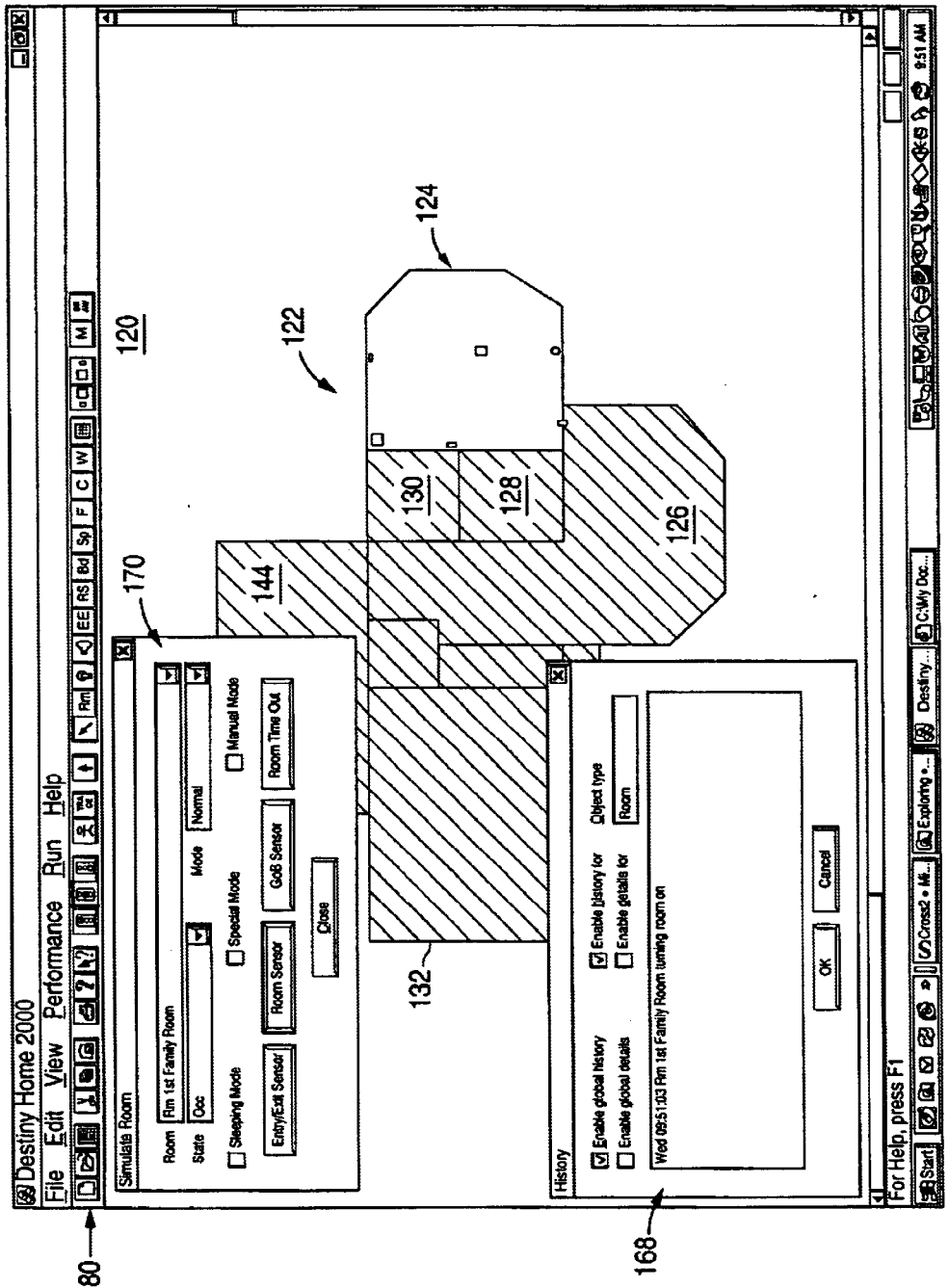
FIG. 14C is a computer generated screen showing the change of the family room Room State in response to the activation of the Room Sensor button.
Figure 14D:
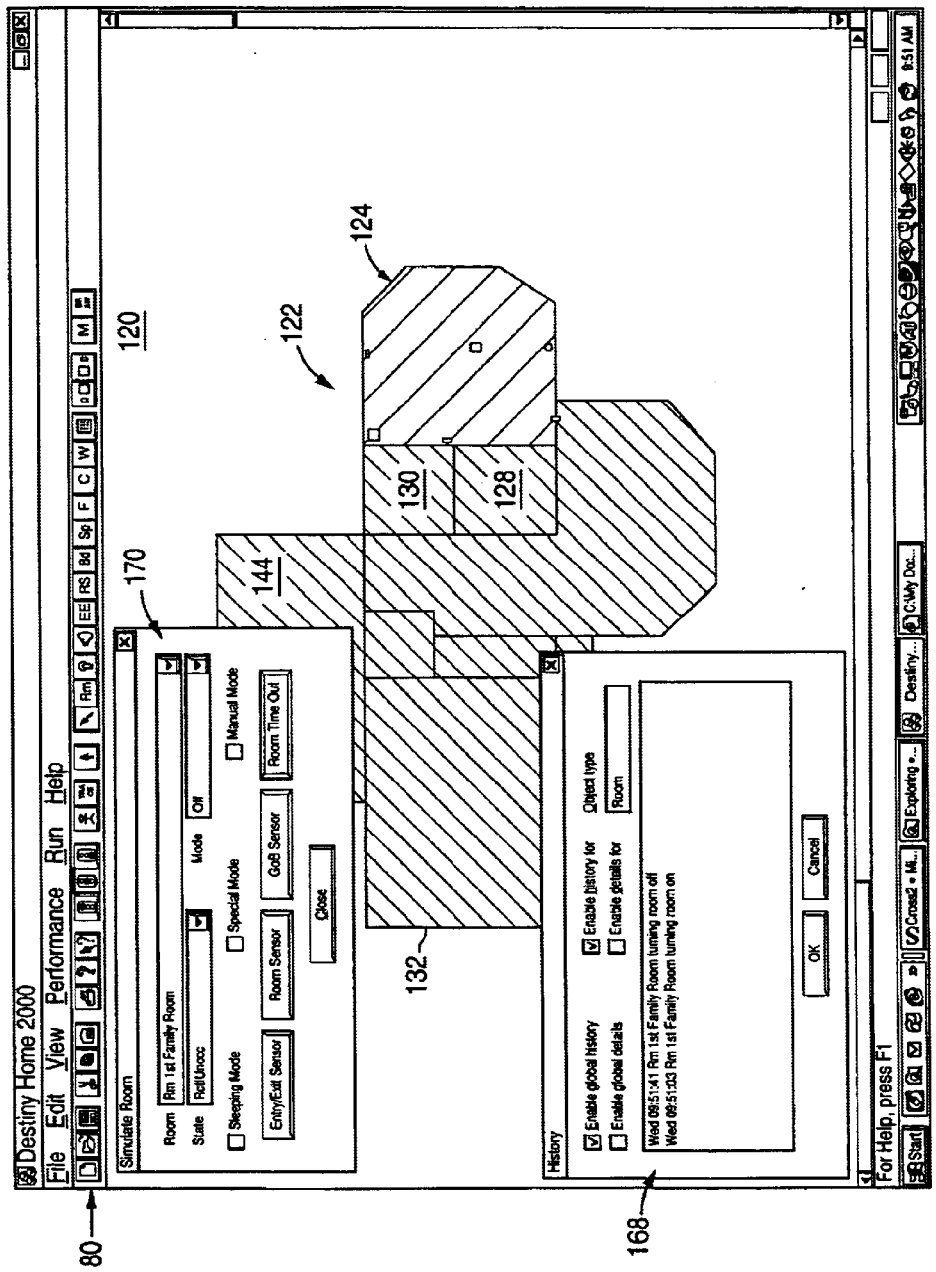
FIG. 14D is a computer generated screen showing the activation of the Room Time Out button on the Simulate Room dialog box, and the corresponding change in the family room Room State.

The Simulate key 162 activates a Simulate Room dialog box 170 that allows the user to manually simulate Cross operation. The Simulate Room dialog box 170 identifies the room to simulate, and includes keys for the user to activate the entry/exit sensor, room (motion) sensor, spot sensor (in this case, a getting out of bed sensor) and room timeout. Cross actively simulates room state changes in response to those keys. This dialog box can be on screen at the same time as the History dialog box 168, which actively tracks the simulations performed using the Simulate Room dialog box 170 (see FIGS. 14A–4D). In FIG. 14C, the Room Sensor key is activated, and in response the family room goes to the Occupied room state (white), and the room state change is noted in the History dialog box 168. In FIG. 14D, the Room Time Out key is activated, and in response the family room goes to the Maybe Unoccupied room state (light gray), and the room state change is noted in the History dialog box 168. The Defaults key 164 and Apply key 166 allow the user to set the attributes to the default settings, and to apply attribute changes, respectively.

5. Adding Sensors and Controlled objects

Figure 15B:
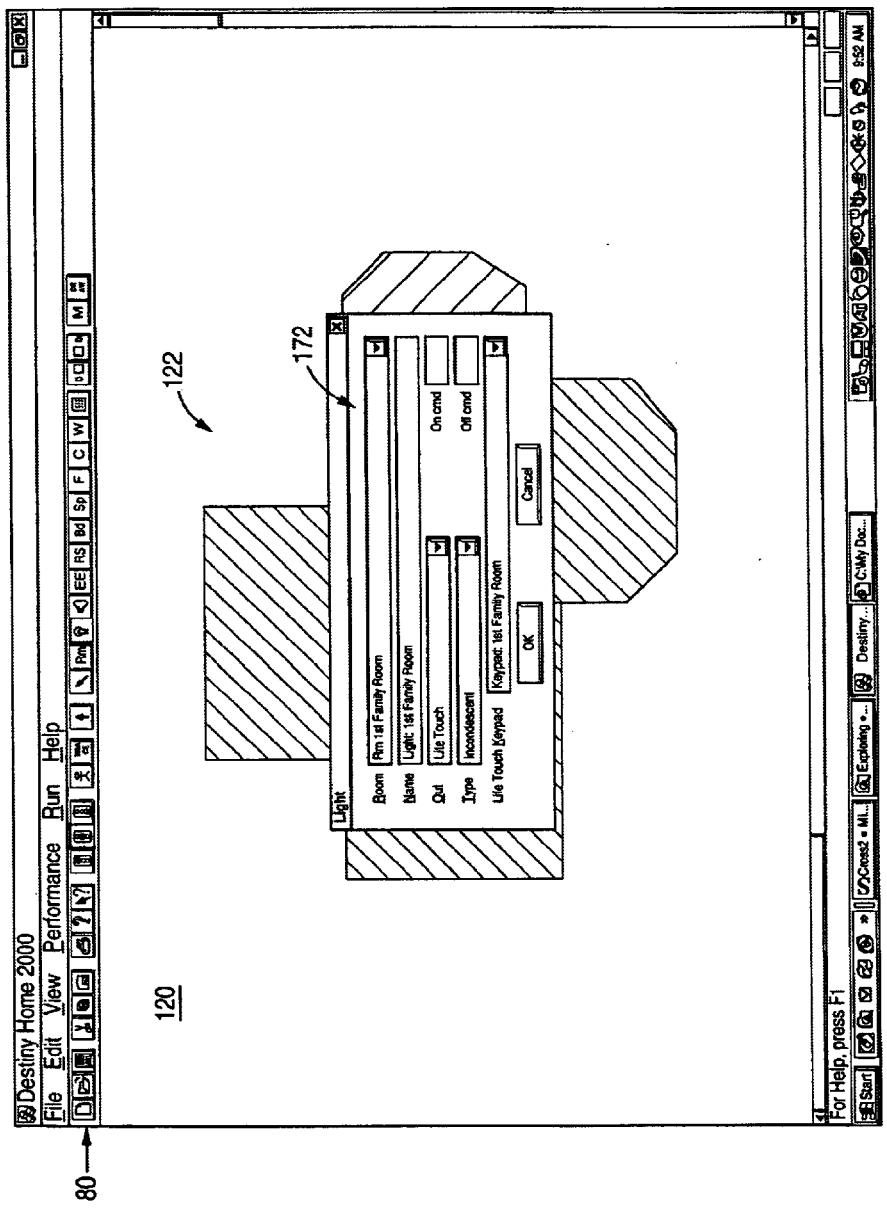
FIG. 15B is a computer generated screen showing the Light dialog box for defining a new light.

Sensors and controlled objects are added using the keys 94–112 on toolbar 80. Once the user activates the appropriate key and then clicks on the location in the floor plan 122 where the object is to be added, Cross brings up a dialog box that allows the user add the appropriate sensor or controlled object to the desired location. For example, in FIGS. 15A and 15B, the light key 94 is activated to bring up a Light dialog box for defining a new light. The light may have a hard code associated with it (usually set by moving toggle switches), whereby the user enters the selected address to complete the process of defining the new light. Alternately, Cross has a learn mode in which it generates an address when the new light is selected, and sends the generated address to the light which records and uses it from then on to communicate with Cross. In addition, Cross can work with some third party lighting systems, such as the LiteTouch system as shown in FIG. 15B. Once the attributes are set and the user hits the OK key, an icon is placed on the floor plan showing the installed sensor or controlled object. Other controlled objects and sensors are defined and installed using speaker key 96 (for audio speakers), entry/exit sensor key 89, room motion sensor key 100, getting out of bed sensor key 102 (special spot sensor to detect movement into and out of the bed), spot sensor key 104, fire place key 106, curtain key 108 (for motorized controlled curtains), window key 110 (for motorized controlled windows), and keypad key 112 (for keypads used to communicate with Cross).

Other keys on toolbar 80 include the trace key 86 (for displaying a trace of the state changes of all objects), the multiple object creation key (when selected, allows the user to select a sensor or controlled object and repeatedly install it by clicking on various rooms), magnify/de-magnify keys 114*a*–114*b* (used to magnify the display of the floor plan 122), the macros key 116 (used to create or edit macros), and the re-draw key 118 (which allows the user to redraw all objects).

Cross uses an algorithm to figure out which room an object is placed in. Specifically, when the user selects the point at which the object is to be placed, Cross determines the room it is in by "drawing" a line outward from that point and counting the number of times that line crosses any perimeter of the room. If the resultant number is odd, then the point was inside the room. Otherwise, if the number is even, then the point was outside the room. Cross does an exhaustive search of all rooms until if finds the room "under the point" of the pointing device. It then places this name in the "Room" field of the dialog box of the sensor or controlled object to be added. If the name is wrong, the user can change it. The algorithm can be speeded up by first testing if the point is in the rectangle that bounds the room. If so, then there is no need to "draw the line outward.

6. Intelligent Programming

The automated operation of the house by Cross is programmed by the user defining rooms, sensors, and controlled objects. Initially, the operation of the home is dictated by the default attributes set up in Cross. These defaults are designed to accommodate most users to minimize the time needed to program Cross (taking advantage of this knowledge-based application). If the user wants to modify the operation of the home by Cross, he/she would simply change those room/sensor/controlled-object attributes in the manner described above. Cross additionally can include groups of default attribute settings, so users can select the group of attribute defaults that best match their lifestyles, and minimize the customization the user needs to perform. Cross can also include groups of attribute settings customized for different users, so that shared housing can be customized for the person(s) actually living in the home at that time.

Cross also includes an intelligent programming mode, which is a variation of the history function. In this intelligent programming mode, Cross monitors the activities of the home for a period of time (days or weeks), to determine the habits of the home users and how they prefer the home to operate. Cross then automatically modifies the default attributes of the rooms/sensors/controlled-objects to match the activities and habits previously monitored and learned by Cross. This intelligent programming mode minimizes the time a user needs to spend programming Cross for the desired operation in the user's home.

The above description includes a standard computer configuration, where the user uses a keyboard and a mouse as the input device, to position a cursor on the screen, and activate a button on the mouse to activate icons or buttons associated with that screen position. It should be understood that any conventional means for inputting data to a computer can be used as the input device for the present invention, including function (F1, F2, . . . ) or command (Alt. or Ctrl) keys on the keyboard, a pressure sensitive pad commonly incorporated in conventional laptop computers, a joystick type button for moving the cursor in the display, buttons on the sides of the display, voice recognition software, or even a touch sensitive screen display where the user simply touches the screen position on the display to activate it.

As stated above, in the preferred embodiment, the central controller 16 is a personal computer or dedicated control device running the Cross program, including the user interface functions described above and illustrated in FIGS. 10–15. However, the term 'computer' or 'controller' as used in this disclosure can either be a single computing device, or separate computing or controlling devices that work together, to perform the house automation and simulation functions. For example, in an alternate embodiment, the central controller 16 is a more simplified controlling device, such as a Lynix based system, that controls the home automation system, but does not include some or all of the more sophisticated user interface functions illustrated in FIGS. 10–15 (other than some LEDs or a simple LCD display). Rather, many of the more complex user interface aspects of Cross that are described above are performed using a separate PC/workstation/appliance etc. that can connect to the central controller 16 either locally or remotely, even using external networks or the internet. It should therefore be evident that the Cross program can be split among multiple devices, where the control aspects of Cross are contained on the central controller 16, and many of the user interface aspects of Cross are contained on one or more the external device. Preferably, no matter the sophistication of the central controller interface, the central controller 16 acts as a web server so that any external device having a display and an input device that uses a web browser can serve as the user interface. Not only does this provide connectivity compatibility between devices, but it facilitates remote access via the internet.

E. Service Model that Enables Mass Deployment

Cross can be serviced and supported over the Internet using a website based application containing diagnostic tools for the analysis and resolution of customer support calls. The website offers the following services:

1) Monitoring of the health and operation of the Cross application

2) Monitors the security features of Cross

3) Remote programming to repair or update Cross as needed (e.g. update default settings).

4) Security monitoring of the home network (e.g., intrusion detection)

Every conceivable customization of home automation can be accomplished using Cross. This means that no matter how different various homes are programmed to operate. one application (Cross) can control all these homes, thus allowing a single support system website to monitor and support the central controller in these various homes.

It is to be understood that the present invention is not limited to the embodiments described above and illustrated herein, but encompasses any and all variations falling within the scope of the appended claims. For example, while a "home" is usually associated with a personal residence such as a house or apartment, the home as applied to the present invention essentially includes any area or structure that is divisible into smaller area (i.e. rooms), and contains controllable objects, including only certain portions or rooms in an otherwise larger apartment, house or building. Similarly, while a "room" is usually associated with an area enclosed by walls, a 'room' as applied to the present invention essentially includes any area that the user wants to segregate from another area. Lastly, while a "doorway" is usually associated with an opening defined by a door frame, a doorway as applied to the present invention essentially includes any area through which a person enters and exits a "room".

What is claimed is:

1. A home automation system for a home having a plurality of rooms separated by doorways, wherein each of the rooms has at least one of the doorways associated therewith, the system comprising:

a plurality of controlled objects each disposed in one of the plurality of rooms;

a plurality of entry/exit sensors each disposed at one of the doorways to detect movement of a person therethrough;

a plurality of room motion sensors each disposed in one of the plurality of rooms to detect occupancy by a person therein; and a controller for controlling the controlled objects in response to detected movement by the plurality of entry/exit sensors and detected occupancy by the plurality of room motion sensors;

wherein for at least one of the rooms:

the controller assigns the one room to a first room state in response to no detected movement by any of the entry/exit sensors at the doorway associated with the one room and to no detected occupancy by any of the room motion sensors disposed in the one room, to a second room state in response to detected movement by any of the entry/exit sensors at the doorway associated with the one room, and to a third room state in response to detected occupancy by any of the room motion sensors disposed in the one room; and the control of any of the controlled objects in the one room by the controller varies depending upon which of the first, the second and the third room states the one room is assigned to.

2. The home automation system of claim 1, further comprising:
at least one status sensor for determining a parameter of the home, wherein the controller further controls at least one of the controlled objects in response to the determined parameter of the home.

3. The home automation system of claim 1, further comprising:
at least one spot sensor disposed in the one room to detect occupancy by a person in a specific location within the one room, wherein the controller further controls any of the controlled objects in the one room in response to detected occupancy in the specific location by the spot sensor.

4. The home automation system of claim 1, wherein:
the controller assigns at least one of the controlled objects to a controlled object state in response to at least one of detected movement by one of the entry/exit sensors and detected occupancy by one of the room motion sensors; and
the controller further controls the at least one controlled object in response to the assigned controlled object state.

5. The home automation system of claim 1, wherein the plurality of entry/exit sensors includes at least one light beam detector that comprises:
a sending unit that directs a beam of light across one of the doorways, and
a receiving unit that receives the light beam, wherein the detector is triggered when the light beam is interrupted by movement of a person through the one doorway.

6. The home automation system of claim 1, wherein the plurality of entry/exit sensors includes at least one narrow range motion sensor for detecting movement of a person only in and adjacent to one of the doorways.

7. The home automation system of claim 1, wherein the plurality of entry/exit sensors includes at least one magnetic contact switch for detecting movement of a door mounted in one of the doorways.

8. The home automation system of claim 1, wherein the plurality of entry/exit sensors includes at least one pressure pad switch for detecting weight of a person walking through one of the doorways.

9. The home automation system of claim 1, further comprising:
a communications network connected between the controller, the plurality of entry/exit sensors, the plurality of room motion sensors, and the plurality of controlled objects.

10. The home automation system of claim 1, further comprising:
a power outlet for connection to an AC power source, the power outlet includes:
at least one multi-prong receptacle for receiving a power plug from an AC power driven device; and
a communications port for sending and receiving signals over the communications network.

11. The home automation system of claim 1, wherein for the one room:
the second room state has an expiration time period associated therewith, wherein the second room state expires in response to no detected occupancy by any of the room motion sensors disposed in the one room during the second room expiration time period;
the controller assigns the one room from the second room state to a fourth room state in response to the expiration of the second room state; and
the control of any of the controlled objects in the one room by the controller while the one room is assigned to the fourth room state varies from the control thereof while the one room is assigned to the second room state.

12. The home automation system of claim 1, wherein for the one room:
the third room state has an expiration time period associated therewith, wherein the third room state expires in response to no detected occupancy by any of the room motion sensors disposed in the one room during the third room expiration time period;
the controller assigns the one room from the third room state to the fourth room state in response to the expiration of the third room state; and
the control of any of the controlled objects in the one room by the controller while the one room is assigned to the fourth room state varies from the control thereof while the one room is assigned to the third room state.

13. The home automation system of claim 1, wherein for the one room:
the second room state has an expiration time period associated therewith, wherein the second room state expires in response to no detected occupancy by any of the room motion sensors disposed in the one room during the second room expiration time period;
the third room state has an expiration time period associated therewith, wherein the third room state expires in response to no detected occupancy by any of the room motion sensors disposed in the one room during the third room expiration time period;
the controller assigns the one room from the second room state to a fourth room state in response to the expiration of the second room state;
the controller assigns the one room from the third room state to the fourth room state in response to the expiration of the third room state; and
the control of any of the controlled objects in the one room by the controller while the one room is assigned to the fourth room state varies from the control thereof while the one room is assigned to the second or third room states.

14. The home automation system of claim 1, wherein for the one room:
the controller assigns the one room from the third room state to the second room state in response to detected movement by any of the entry/exit sensors at the doorway associated with the one room while the one room is assigned to the third room state.

15. The home automation system of claim 1, wherein for the one room:
the controller assigns the one room from the second room state to the third room state in response to detected occupancy by any of the room motion sensors disposed in the one room while the one room is assigned to the second room state.

16. The home automation system of claim 2, further comprising:
at least one status sensor for determining a parameter of the home, wherein the controller assigns at least one of the controlled objects to a controlled object state in response to at least one of detected movement by one of the entry/exit sensors, detected occupancy by one of the room motion sensors, and the determined home parameter by the status sensor; and wherein the controller further controls the at least one controlled object in response to the assigned controlled object state independent of which of the first, second and third room states the one room is assigned to.

17. The home automation system of claim 2, wherein the home parameter includes at least one of a time of day, a level of ambient light, and a level of ambient temperature.

18. The home automation system of claim 2, wherein the home parameter includes at least one of a position of a door lock, a fingerprint detected from a person activating a home doorbell, a moisture content outside the home, a level of a pool of the home, a carbon monoxide level inside the home, a humidity level inside the home, a water level in a basement of the home, and a temperature of water pipes underneath the home.

19. The home automation system of claim 3, wherein the controller assigns the one room to the third room state in response to detected occupancy in the specific location by the spot sensor.

20. The home automation system of claim 3, wherein the spot sensor includes at least one of a narrow range motion sensor for detecting occupancy in the specific location, a light beam detector having a sending unit to direct a beam of light across the specific location and a receiving unit to receive the light beam, and a pressure pad switch for detecting weight of a person walking through the specific location.

21. The home automation system of claim 5, further comprising:
a reflective material disposed on a first side of the one doorway, wherein the sending unit and receiving unit are disposed on a second side of the one doorway such that the reflective material reflects the light beam from the sending unit back across the one doorway toward the receiving unit.

22. The home automation system of claim 9, wherein:
the communications network includes wires that extend to each of the rooms in the home, and
each of the plurality of entry/exit sensors, the plurality of room motion sensors, and the plurality of controlled objects has a unique address on the communications network for identification by the controller.

23. The home automation system of claim 9, wherein:
the communications network includes at least one hub, the controller is connected to the at least one hub, and
each of the plurality of entry/exit sensors, the plurality of room motion sensors, and the plurality of controlled objects are connected to the at least one hub.

24. The home automation system of claim 9, wherein:
the communications network includes a wireless transceiver connected to the controller, and
each of the plurality of entry/exit sensors, the plurality of room motion sensors, and the plurality of controlled objects includes a transceiver for communicating with the transceiver connected to the controller.

25. The home automation system of claim 9, wherein the communications network includes:
a power line transceiver connected between the controller and AC powerlines in the home;
a plurality of powerline transceivers each of which connected between the home AC powerlines and one of the plurality of entry/exit sensors, the plurality of room motion sensors, and the plurality of controlled objects for communicating with the powerline transceiver connected to the controller.

26. The home automation system of claim 10, further comprising at least one of an IR transmitter jack for connection to an IR transmitter that generates infrared signals in response to the signals received by the communications port, and an IR receiver jack for connection to an IR receiver that generates electrical signals for transmission by the communications port over the communications network in response to infrared signals received by the IR receiver.

27. The home automation system of claim 10, further comprising:
a power switch for turning AC power on and off to the multi-prong receptacle in response to the signals received by the communications port.

28. The home automation system of claim 10, further comprising:
an electrical current sensor for measuring an electrical current through the multi-prong receptacle, and for generating an output signal based upon the electrical current measurement for transmission by the communications port over the communications network.

29. The home automation system of claim 11, wherein for the one room:
the second room state expires in response to no detected occupancy by any of the room motion sensors disposed in the one room and no detected movement by any of the entry/exit sensors at the doorway associated with the one room during the second room expiration time period.

30. The home automation system of claim 12, wherein for the one room:
the third room state expires in response to no detected occupancy by any of the room motion sensors disposed in the one room and no detected movement by any of the entry/exit sensors at the doorway associated with the one room during the third room expiration time period.

31. The home automation system of claim 13, wherein the second room expiration time period is less than the third room expiration time period.

32. The home automation system of claim 13, wherein the control of any of the controlled objects in the one room by the controller varies depending upon which of the first, the second and the third room states the one room is assigned to by at least having the second room expiration time period be different in length than the third room expiration time period.

33. The home automation system of claim 13, wherein for the one room:
the fourth room state has an expiration time period associated therewith, wherein the fourth room state expires in response to no detected occupancy by any of the room motion sensors disposed in the one room during the fourth room expiration time period; and
the controller assigns the one room from the fourth room state to the first room state in response to the expiration of the fourth room state.

34. The home automation system of claim 13, wherein for the one room:
the controller assigns the one room from the fourth room state to the second room state in response to detected movement by any of the entry/exit sensors at the doorway associated with the one room while the one room is assigned to the fourth room state.

35. The home automation system of claim 13, wherein for the one room:
the controller assigns the one room from the fourth room state to the third room state in response to detected occupancy by any of the room motion sensors disposed in the one room while the one room is assigned to the fourth room state.

36. The home automation system of claim 1, wherein for the one room:
   the one room includes a manually activatable button/switch device for sending a signal to the controller, wherein in the response to the signal received by the controller while the one room is assigned to the second or third room states, the controller assigns the one room from the second or third room states to a fourth room state; and
   the control of any of the controlled objects in the one room by the controller while the one room is assigned to the fourth room state varies from the control thereof while the one room is assigned to the second or third room states.

37. The home automation system of claim 21, wherein the sending unit is disposed at a height from a bottom of the one doorway which is different from a height from the bottom of the one doorway at which the receiving unit is disposed.

38. The home automation system of claim 33, wherein for the one room:
   the fourth room state expires in response to no detected occupancy by any of the room motion sensors disposed in the one room and no detected movement by any of the entry/exit sensors at the doorway associated with the one room during the fourth room expiration time period.

39. The home automation system of claim 36, wherein for the one room:
   the fourth room state has an expiration time period associated therewith, wherein the fourth room state expires in response to no detected occupancy by any of the room motion sensors disposed in the one room during the fourth room expiration time period; and
   the controller assigns the one room from the fourth room state to the first room state in response to the expiration of the fourth room state.

40. The home automation system of claim 39, wherein for the one room:
   the fourth room state expires in response to no detected occupancy by any of the room motion sensors disposed in the one room and no detected movement by any of the entry/exit sensors at the doorway associated with the one room during the fourth room expiration time period.

41. A method of automated control of a plurality of controlled objects disposed in a plurality of rooms in a home that are separated by doorways, wherein a plurality of entry/exit sensors are each disposed at one of the doorways to detect movement of a person therethrough and a plurality of room motion sensors are each disposed in one of the rooms to detect occupancy by a person therein, and wherein each room has at least one of the doorways associated therewith, the method comprising:
   controlling the controlled objects in response to detected movement by the plurality of entry/exit sensors and in response to detected occupancy by the plurality of room motion sensors, wherein for at least one of the rooms the controlling of the controlled objects includes:
      assigning the one room to a first room state in response to no detected movement by any of the entry/exit sensors at the doorway associated with the one room and no detected occupancy by any of the room motion sensors disposed in the one room;
      assigning the one room to a second room state in response to detected movement by any of the entry/exit sensors at the doorway associated with the one room;
      assigning the one room to a third room state in response to detected occupancy by any of the room motion sensors disposed in the one room; and
      controlling any of the controlled objects in the one room in a manner that varies depending upon which of the first, the second and the third room states the one room is assigned to.

42. The method claim 41, further comprising:
   controlling at least one of the controlled objects in response to a status sensor that determines a home parameter.

43. The method of claim 41, further comprising:
   controlling at least one of the controlled objects in the one room in response to a spot sensor placed in the one room for detecting occupancy by a person in a specific location within the one room.

44. The method of claim 41, further comprising:
   assigning at least one of the controlled objects to a controlled object state in response to at least one of detected movement by one of the entry/exit sensors and detected occupancy by one of the room motion sensors; and
   controlling the at least one controlled object in response to the assigned controlled object state.

45. The method of claim 41, wherein the second room state has an expiration time period associated therewith, the method further comprising:
   expiring the second room state in response to no detected occupancy by any of the room motion sensors disposed in the one room during the second room expiration time period; and
   assigning the one room from the second room state to a fourth room state in response to the expiration of the second room state;
   wherein the control of any of the controlled objects in the one room while the one room is assigned to the fourth room state varies from the control thereof while the one room is assigned to the second room state.

46. The method of claim 41, wherein the third room state has an expiration time period associated therewith, the method further comprising:
   expiring the third room state in response to no detected occupancy by any of the room motion sensors disposed in the one room during the third room expiration time period; and
   assigning the one room from the third room state to the fourth room state in response to the expiration of the third room state;
   wherein the control of any of the controlled objects in the one room while the one room is assigned to the fourth room state varies from the control thereof while the one room is assigned to the third room state.

47. The method of claim 41, wherein the second room state has an expiration time period associated therewith and the third room state has an expiration time period associated therewith, the method further comprising:
   expiring the second room state in response to no detected occupancy by any of the room motion sensors disposed in the one room during the second room expiration time period;
   expiring the third room state in response to no detected occupancy by any of the room motion sensors disposed in the one room during the third room expiration time period;

assigning the one room from the second room state to a fourth room state in response to the expiration of the second room state; and assigning the one room from the third room state to the fourth room state in response to the expiration of the third room state;

wherein the control of any of the controlled objects in the one room while the one room is assigned to the fourth room state varies from the control thereof while the one room is assigned to the second or third room states.

48. The method of claim 41, further comprising:

assigning the one room from the third room state to the second room state in response to detected movement by any of the entry/exit sensors at the doorway associated with the one room while the one room is assigned to the third room state.

49. The method of claim 41, further comprising:

assigning the one room from the second room state to the third room state in response to detected occupancy by any of the room motion sensors disposed in the one room while the one room is assigned to the second room state.

50. The method of claim 41, wherein the one room includes a manually activatable button/switch device, further comprising:

assigning the one room from the second or third room states to a fourth room state in response to an activation of the button/switch device while the one room is assigned to the second or third room states;

wherein the control of any of the controlled objects in the one room while the one room is assigned to the fourth room state varies from the control thereof while the one room is assigned to the second or third room states.

51. The method of claim 42, further comprising:

assigning at least one of the controlled objects to a controlled object state in response to at least one of detected movement by one of the entry/exit sensors, detected occupancy by one of the room motion sensors, and the determined home parameter by the status sensor; and controlling the at least one controlled object in response to the assigned controlled object state independent of which of the first, second and third room states the one room is assigned to.

52. The method of claim 42, wherein the home parameter includes at least one of a time of day, a level of ambient light, and a level of ambient temperature.

53. The method of claim 42, wherein the home parameter includes at least one of a position of a door lock, a fingerprint detected from a person activating a home doorbell, a moisture content outside the home, a level of a pool of the home, a carbon monoxide level inside the home, a humidity level inside the home, a water level in a basement of the home, and a temperature of water pipes underneath the home.

54. The method of claim 43, further comprising:

assigning the room to the third room state in response to detected occupancy in the specific location by the spot sensor.

55. The method of claim 45, wherein the expiring of the second room state includes:

expiring the second room state in response to no detected occupancy by any of the room motion sensors disposed in the one room and no detected movement by any of the entry/exit sensors at the doorway associated with the one room during the second room expiration time period.

56. The method of claim 46, wherein the expiring of the third room state includes:

expiring the third room state in response to no detected occupancy by any of the room motion sensors disposed in the one room and no detected movement by any of the entry/exit sensors at the doorway associated with the one room during the third room expiration time period.

57. The method of claim 47, wherein the second room expiration time period is less than the third room expiration time period.

58. The method of claim 47, wherein the control of any of the controlled objects in the one room by the controller varies depending upon which of the first, the second and the third room states the one room is assigned to by at least having the second room expiration time period be different in length than the third room expiration time period.

59. The method of claim 47, wherein the fourth room state has an expiration time period associated therewith, the method further comprising:

expiring the fourth room state in response to no detected occupancy by any of the room motion sensors disposed in the one room during the fourth room expiration time period; and assigning the one room from the fourth room state to the first room state in response to the expiration of the fourth room state.

60. The method of claim 47, further comprising:

assigning the one room from the fourth room state to the second room state in response to detected movement by any of the entry/exit sensors at the doorway associated with the one room while the one room is assigned to the fourth room state.

61. The method of claim 47, further comprising:

assigning the one room from the fourth room state to the third room state in response to detected occupancy by any of the room motion sensors disposed in the one room while the one room is assigned to the fourth room state.

62. The method of claim 50, wherein the fourth room state has an expiration time period associated therewith, further comprising:

expiring the fourth room state in response to no detected occupancy by any of the room motion sensors disposed in the one room during the fourth room expiration time period; and assigning the one room from the fourth room state to the first room state in response to the expiration of the fourth room state.

63. The method of claim 59, wherein the expiring of the fourth room states comprises:

expiring the fourth room state in response to no detected occupancy by any of the room motion sensors disposed in the one room and no detected movement by any of the entry/exit sensors at the doorway associated with the one room during the fourth room expiration time period.

64. The method of claim 62, wherein the expiring of the fourth room state comprises:

expiring the fourth room state in response to no detected occupancy by any of the room motion sensors disposed in the one room and no detected movement by any of the entry/exit sensors at the doorway associated with the one room during the fourth room expiration time period.

* * * * *